(12) United States Patent
Dunjic et al.

(10) Patent No.: US 11,687,933 B2
(45) Date of Patent: Jun. 27, 2023

(54) ELECTRONIC ACCOUNT SETTLEMENT VIA DISTINCT COMPUTER SERVERS

(71) Applicant: The Toronto-Dominion Bank, Toronto (CA)

(72) Inventors: Milos Dunjic, Oakville (CA); David Samuel Tax, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 419 days.

(21) Appl. No.: 16/132,308

(22) Filed: Sep. 14, 2018

(65) Prior Publication Data

US 2020/0090181 A1  Mar. 19, 2020

(51) Int. Cl.
*G06Q 20/40* (2012.01)
*G06Q 20/20* (2012.01)
*G06Q 20/38* (2012.01)

(52) U.S. Cl.
CPC ....... *G06Q 20/4014* (2013.01); *G06Q 20/204* (2013.01); *G06Q 20/387* (2013.01); *G06Q 20/4012* (2013.01)

(58) Field of Classification Search
CPC ............. G06Q 20/4014; G06Q 20/204; G06Q 20/387; G06Q 20/4012
See application file for complete search history.

(56) References Cited

U.S. PATENT DOCUMENTS

| | | | |
|---|---|---|---|
| 8,924,246 B1 | 12/2014 | Chen et al. | |
| 2007/0067236 A1* | 3/2007 | Deinhardt | G06Q 40/02 705/39 |
| 2008/0092139 A1* | 4/2008 | Ruby | G06F 9/466 718/101 |

(Continued)

FOREIGN PATENT DOCUMENTS

| | | | | |
|---|---|---|---|---|
| EP | 3447705 A1 * | 2/2019 | | G06F 21/62 |
| WO | WO-2013028910 A2 * | 2/2013 | | G06Q 20/10 |
| WO | 2014063192 A1 | 10/2013 | | |

OTHER PUBLICATIONS

Bruce Schneier, "Schneier on Security—Cryptanalysis of SHA-1", https://www.schneier.com/blog/archives/2005/02/cryptanalysis_o.html, Feb. 18, 2005.

*Primary Examiner* — Jacob C. Coppola
*Assistant Examiner* — Terry Nathan Murray
(74) *Attorney, Agent, or Firm* — Graham Patent Law

(57) ABSTRACT

A server includes a processor that receives, from a first device, initiation message(s) each including a service identifier and a service value and, for each initiation message, saves in a database a record comprising the service identifier in association with the service value. The processor receives, from a second device, authorization message(s) each including one of the service identifiers and an authorization value, and for each authorization message, validates one of the initiation messages by (i) locating in the database the record comprising the one service identifier, and (ii) confirming that the service value in the located database record matches the (Continued)

authorization value. The processor updates a journal with an entry identifying a transfer between a first ledger and a second ledger in an amount equal to a sum of the service values of the validated initiation messages, and provides the first device with a message confirming the transfer.

20 Claims, 8 Drawing Sheets

(56) References Cited

U.S. PATENT DOCUMENTS

| | | | | |
|---|---|---|---|---|
| 2012/0179476 | A1* | 7/2012 | Muncy | G06Q 30/0207 |
| | | | | 705/1.1 |
| 2015/0120567 | A1* | 4/2015 | Van Rooyen | G06F 21/10 |
| | | | | 705/59 |
| 2015/0278811 | A1 | 10/2015 | Lalchandani | |
| 2016/0306982 | A1* | 10/2016 | Seger, II | H04L 9/14 |
| 2017/0154333 | A1* | 6/2017 | Gleeson | G06Q 20/027 |
| 2018/0114205 | A1* | 4/2018 | Thomas | G06Q 40/02 |
| 2018/0225640 | A1* | 8/2018 | Chapman | G06Q 20/0855 |
| 2018/0324184 | A1* | 11/2018 | Kaja | G06Q 20/38215 |
| 2019/0172059 | A1* | 6/2019 | Castagna | G06Q 20/389 |
| 2019/0311148 | A1* | 10/2019 | Andrade | H04L 63/102 |
| 2019/0356674 | A1* | 11/2019 | Irazabal | H04L 63/105 |
| 2019/0373472 | A1* | 12/2019 | Smith | H04L 9/3239 |

* cited by examiner

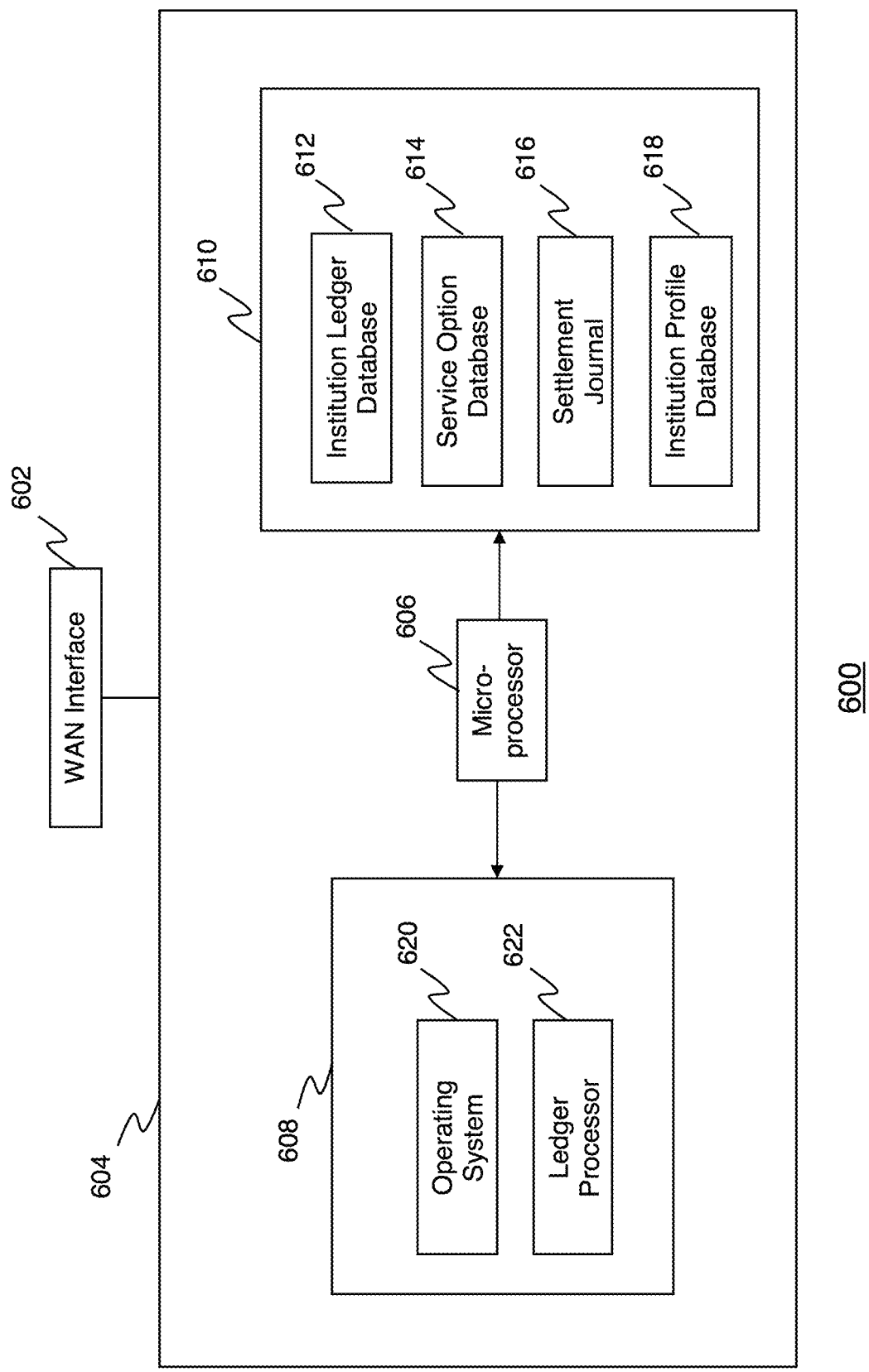

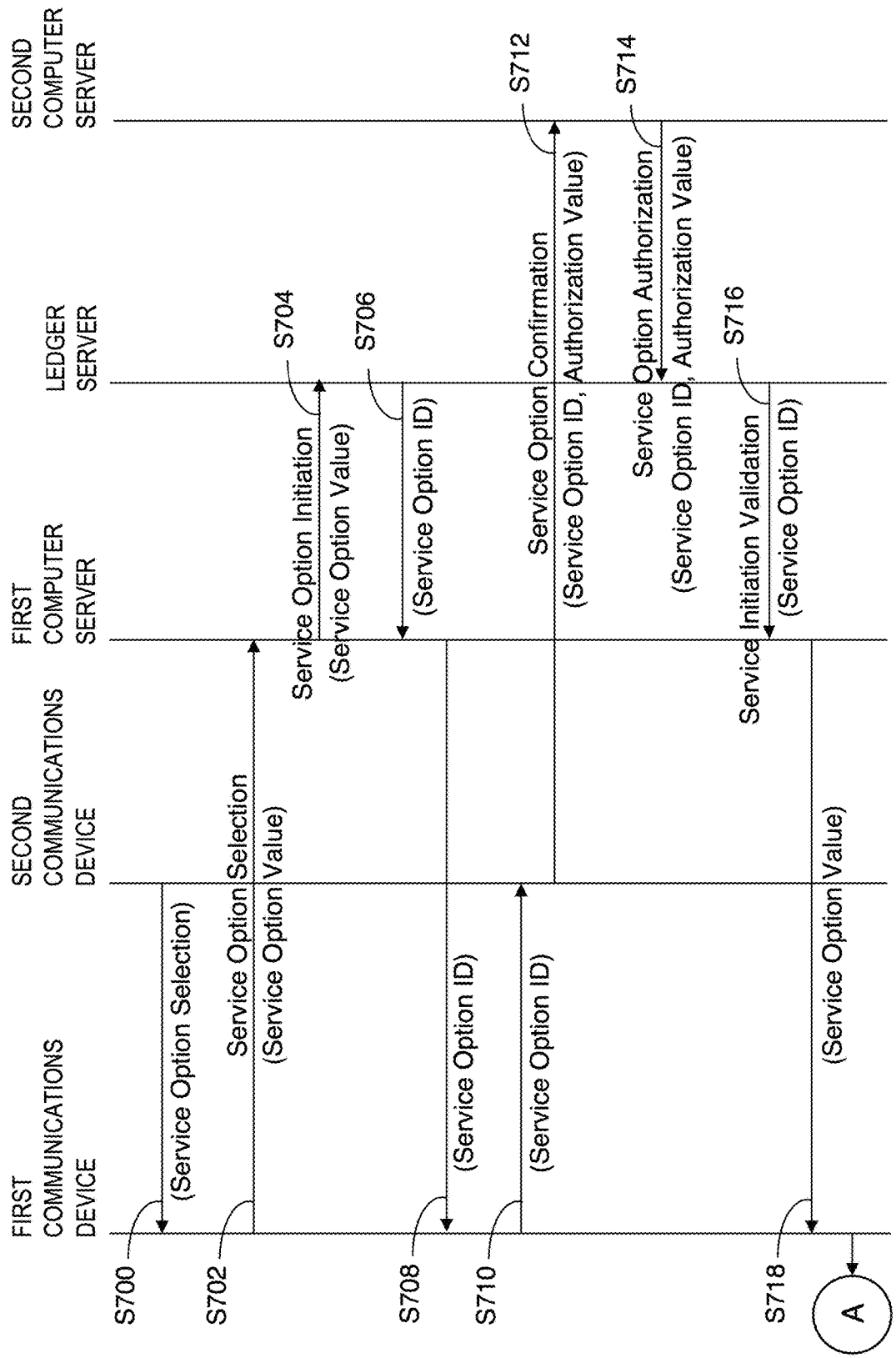

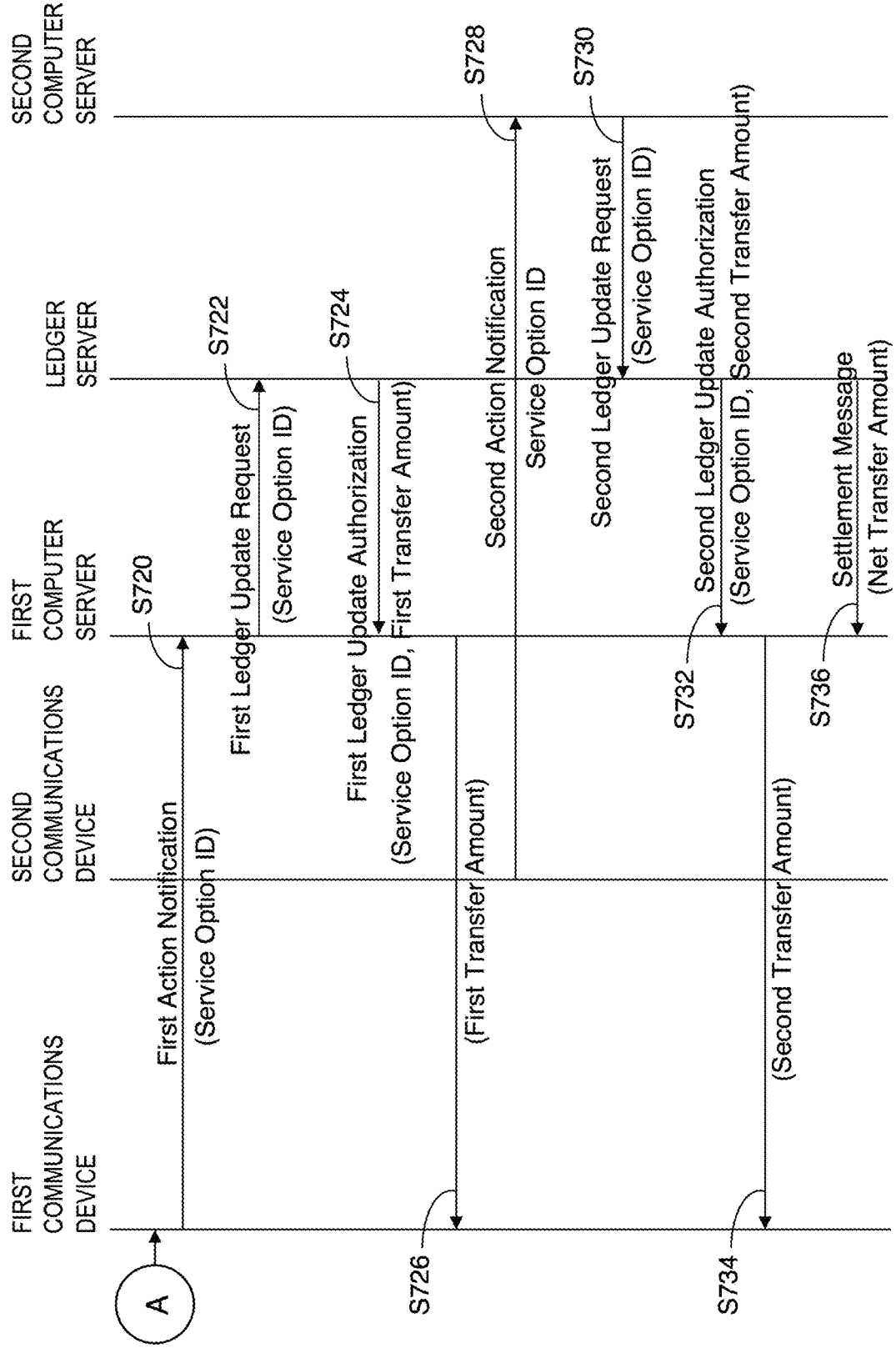

ELECTRONIC ACCOUNT SETTLEMENT VIA DISTINCT COMPUTER SERVERS

FIELD

This patent application relates to a method and network for settling accounts over a computer network.

BACKGROUND

To effect an electronic payment between a consumer and a merchant, the consumer may provide the merchant with a payment card which carries particulars of the consumer's credit or debit account. The merchant's point-of-sale terminal may request authorization for the payment by transmitting the required payment amount and the account particulars to the merchant's (acquirer) financial institution server. The payment amount and account particulars are, in turn, routed over a computer network to the payment card issuer, for authorization. The merchant subsequently requests receipt of the authorized payments by using the merchant's point-of-sale terminal to transmit the accumulated transaction information to the acquirer server. The transaction information is, in turn, routed over the computer network for reconciliation by the payment card issuers.

Since the consumer's account information and the merchant's accumulated transaction information are routed over the same computer network from the same point-of-sale terminal and acquirer server, the security of the electronic payment process is limited by the strength of the security measures implemented by the point-of-sale terminal, acquirer server and computer network.

SUMMARY

This patent application discloses a ledger server, a data processing network, and an associated method in which the ledger server receives service option initiation messages (notifying of a service option selection) and service option authorization messages (notifying of authorization of a service option) from separate and distinct computer servers, and effects a transfer between institution ledgers that are associated with the respective computer servers after validating the initiation messages from the authorization messages. In this context, a service option may include, but is not limited to, goods and/or services that are available from a merchant.

In accordance with a first aspect of this disclosure, there is provided a ledger server that includes a memory and a data processor that is communication with the memory. The memory may store a service option database and a settlement journal.

The memory may also store computer processing instructions which, when executed by the data processor, causes the data processor to receive at least one service option initiation message from a first computer server. Each service option initiation message includes a service option identifier and a service option value. For each service option initiation message, the data processor may save, in the service option database, a database record that includes the service option identifier in association with the service option value.

The computer processing instructions also cause the data processor(s) to receive at least one service option authorization message from a second computer server that is distinct from the first computer server. Each service option authorization message includes one of the service option identifiers and an authorization value. For each event authorization message, the data processor may validate one of the service option initiation messages, for example, by: (i) locating in the service option database the database record that includes the one service option identifier, and (ii) confirming that the service option value in the located database record matches the authorization value.

The computer processing instructions also cause the data processor(s) to update the settlement journal with a settlement journal entry that identifies a transfer between a first ledger and a second ledger in an amount equal to a sum of the requested service option values of the validated event initiation messages. The data processor may also provide the first computer server with a settlement message that confirms the transfer.

In accordance with a second aspect of this disclosure, there is provided a data processing network that includes a ledger server, a first computer server, and a second computer server that is distinct from the first computer server.

The ledger server is configured to receive at least one service option initiation message from the first computer server. Each service option initiation message includes a service option identifier and a service option value. For each service option initiation message, the ledger server may save, in a service option database, a database record that includes the service option identifier in association with the service option value.

The ledger server is configured to receive at least one service option authorization message from the second computer server. Each service option authorization message includes one of the service option identifiers and an authorization value. For each service option authorization message, the ledger server may validate one of the service option initiation messages by, for example, (i) locating in the service option database the database record that includes the one service option identifier, and (ii) confirming that the service option value in the located database record matches the authorization value.

The ledger server is also configured to update a settlement journal with a settlement journal entry that identifies a transfer between a first institution ledger and a second institution ledger in an amount equal to a sum of the requested service option values of the validated service option initiation messages. The ledger server may also be configured to provide the first computer server with a settlement message that confirms the transfer.

In accordance with a third aspect of this disclosure, there is provided a method of institution ledger settlement that involves a ledger server receiving at least one service option initiation message from a first computer server. Each service option initiation message includes a service option identifier and a service option value. For each service option initiation message, the ledger server may save, in a service option database, a database record that includes the service option identifier in association with the service option value.

The method also involves the ledger server receiving at least one service option authorization message from a second computer server that is distinct from the first computer server. Each service option authorization message includes one of the service option identifiers and an authorization value. For each service option authorization message, the ledger server may validate one of the service option initiation messages by, for example, (i) locating in the service option database the database record that includes the one service option identifier, and (ii) confirming that the service option value in the located database record matches the authorization value.

The method also involves the ledger server updating a settlement journal with a settlement journal entry that identifies a transfer between a first institution ledger and a second institution ledger in an amount equal to a sum of the service option values of the validated service option initiation messages. The ledger server may also provide the first computer server with a settlement message confirming the transfer.

In one implementation, the ledger server updates the located database record with a confirmation database entry that confirms that the service option value of the located database record matches the authorization value, receives from the first computer server a first ledger update request that includes the one service option identifier, locates in the service option database the database record that includes the one service option identifier; and confirms that the located database record includes the confirmation database entry. The ledger server also determines a first transfer amount that is less than the service option value of the located database record, and transmits to the first computer server a first ledger update authorization that includes the one service option identifier and authorizes a first partial transfer in an amount equal to the first transfer amount.

In one implementation, the ledger server receives from the second computer server a second ledger update request that includes the one service option identifier, locates in the service option database the database record that includes the one service option identifier, and confirms that the located database record includes the confirmation database entry. The ledger server also determines a second transfer amount (e.g. from the difference between the first transfer amount and the service option value of the located database record), and transmits to the first computer server a second ledger update authorization that includes the one service option identifier and authorizes a second partial transfer in an amount equal to the second transfer amount.

In one implementation, the second computer server receives a (second) credential and a service option confirmation message from a second communications device. The service option confirmation message includes the one service option identifier and the authorization value. The second computer server determines a second customer ledger from the (second) credential, updates a transaction journal with a transaction journal entry that identifies a transfer from the second customer ledger in an amount equal to the authorization value. The second computer server also incorporates the one service option identifier and the authorization value into the service option authorization message, and transmits the service option authorization message to the ledger server. Preferably, the service option authorization message excludes particulars of the second customer ledger.

Since, in accordance with the foregoing aspects of the disclosure, the ledger server updates the settlement journal only after the validating the service option initiation messages from the respective service option authorization message, and the ledger server receives the service option messages from computer servers that are distinct from those which the ledger server receives the service option authorization messages, the security of the technical process of effecting a transfer between the service recipient's financial institution and the service provider's (acquirer) financial institution is improved in comparison to conventional electronic payment processes in which authorization and clearing/settlement messages are all sent over a payment network from the same (acquirer) server.

Further, since the service option authorization message (received at the ledger server) may exclude particulars of the service recipient's customer ledger, the security of the technical process of releasing funds/points to the service provider is improved in comparison to conventional electronic payment processes in which the service recipient's account information is received by the service provider's (acquirer) server and is transmitted over a payment network between the acquirer server and the service recipient's (issuer) server.

BRIEF DESCRIPTION OF THE DRAWINGS

An exemplary data processing network, ledger server, and method of institution ledger settlement will now be described, with reference to the accompanying drawings, in which:

FIG. 6 is a schematic view of an exemplary ledger server; and

FIGS. 7a and 7b together are a message flow diagram that depicts an exemplary method of institution ledger settlement.

DETAILED DESCRIPTION

Data Processing Network—Overview

Figure 1:
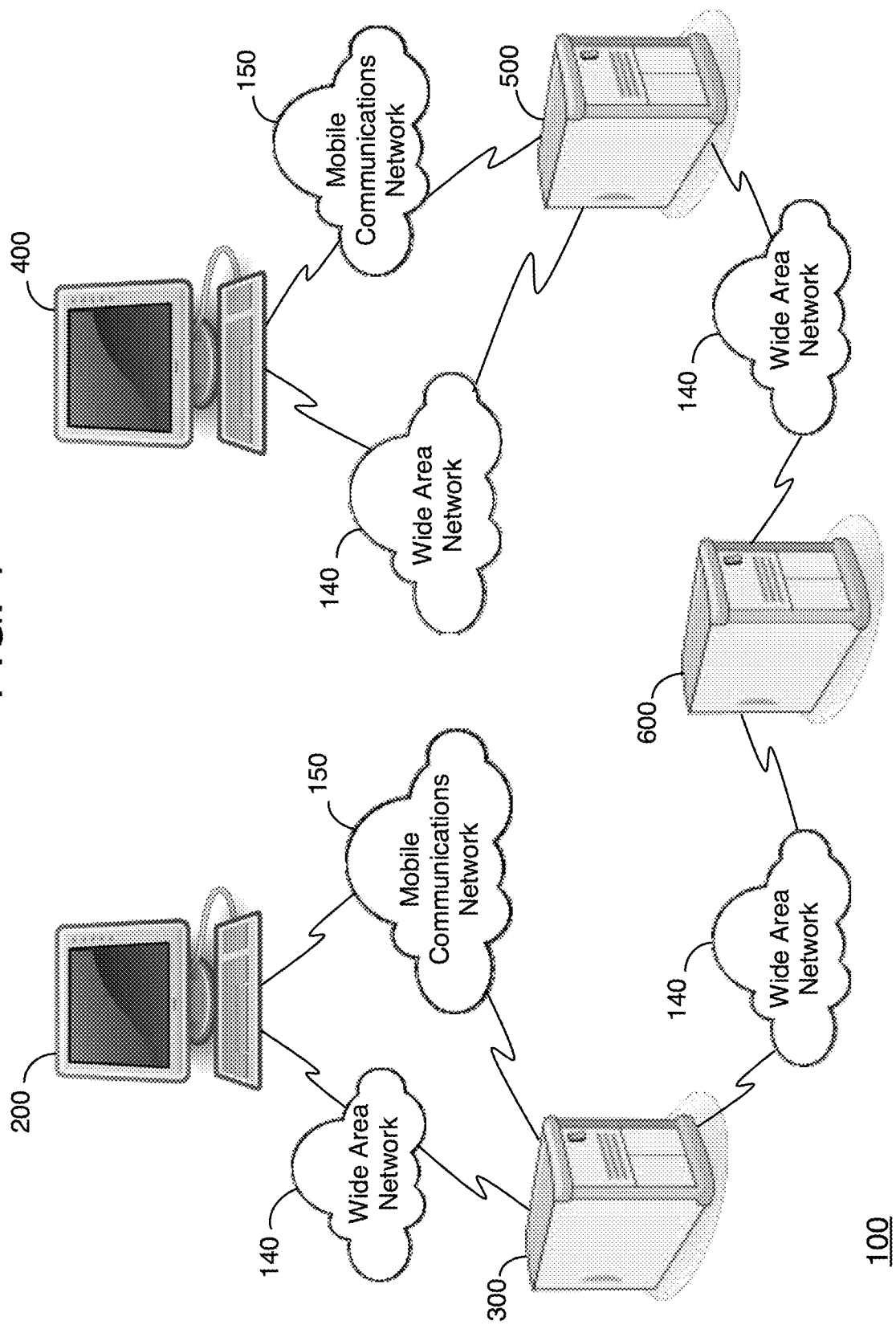
FIG. 1 is a schematic view of an exemplary data processing network, depicting first and second communications devices, first and second computer servers, and a ledger server.

FIG. 1 is a schematic view of a data processing network, denoted generally as 100. As shown, the data processing network 100 includes a first communications device 200, a first computer server 300, a second communications device 400, a second computer server 500, and a ledger server 600.

The first communications device 200 may be configured to communicate with the first computer server 300 via a wide area network 140, such as the Internet. Alternately, or additionally, the first communications device 200 may be configured to communicate with the first computer server 300 via a mobile cellular communications network 150.

The first computer server 300 is configured to communicate with the first communications device 200 via the wide area network 140 and/or the mobile communications network 150. The first computer server 300 is also configured to communicate with the ledger server 600 via the wide area network 140.

The second communications device 400 may be configured to communicate with the second computer server 500 via the wide area network 140. Alternately, or additionally, the second communications device 400 may be configured to communicate with the second computer server 500 via the mobile communications network 150.

The second computer server 500 is configured to communicate with the second communications device 400 via the wide area network 140 and/or the mobile communications network 150. The second computer server 500 is also configured to communicate with the ledger server 600 via the wide area network 140.

The mobile communications network 150 may be configured as a LTE, WiMax, UMTS, CDMA or GSM network, as examples. The mobile communications network 150 typically includes a plurality of wireless base station subsystems (not shown). The communications devices 200, 400 may communicate with the base station subsystems via wireless links, and the base station subsystems may communicate with the computer servers 300, 500 via wired, wireless or optical links. Therefore, the base station subsystems act as a bridge between the wireless links and the computer servers 300, 500.

The ledger server 600 is configured to communication with the first computer server 300 and the second computer server 500 via the wide area network 140. Further, the ledger server 600 is configured to validate service initiation messages received at the ledger server 600, and to facilitate a transfer between ledgers for the validated service initiation messages.

For example, as will be discussed, the ledger server 600 may receive from the first computer server 300 a plurality of service option initiation messages each including a service option identifier and a service option value, and may also receive from the second computer server 500 a plurality of service option authorization messages each including the service option identifier and an authorization value. The ledger server 600 may validate service option initiation messages by (i) locating the (received) service option initiation message that has the same service option identifier as that included in one of the (received) service option authorization messages, and (ii) confirming that the service option value of the located service option initiation message matches the authorization value that was included in the one service option authorization message. The ledger server 600 may then update a settlement journal with a journal entry that identifies a transfer between a first institution ledger and a second institution ledger in an amount that is equal to the sum of the service option values of the validated service option initiation messages.

Although the data processing network 100 is shown comprising only a single first communications device 200 and a single second communications device 400, the data processing network 100 typically includes a plurality of the first communications devices 200. Each first communications device 200 is typically associated with a respective service provider. Similarly, the data processing network 100 typically includes a plurality of the second communications devices 400. Each second communications device 400 is typically associated with a respective service recipient, and is separate and distinct from each first communications device 200.

Although the data processing network 100 is also shown comprising only a single first computer server 300 and a single second computer server 500, the data processing network 100 typically includes a plurality of the first computer servers 300. Similarly, the data processing network 100 typically includes a plurality of the second communications devices 400.

Further, although the first computer server 300, the second computer server 500 and the ledger server 600 are depicted as distinct servers in FIG. 1, all or part of the functionality implemented by the ledger server 600 may instead be implemented by the first computer server 300 or the second computer server 500. Moreover, in some situations, all or part of the functionality implemented by the second computer server 500 and the ledger server 600 may instead be implemented by the first computer server 300.

First Communications Device

The first communications device 200 is typically associated with a service provider. The first communications device 200 may be deployed at the service provider's business premises, and may be implemented as an integrated point-of-sale (POS) terminal, or as a pin-pad device that communicates with an electronic cash register (ECR). Alternately, the first communications device 200 may be deployed remotely from the service provider's business premises, and may be implemented as a web server.

Figure 2:
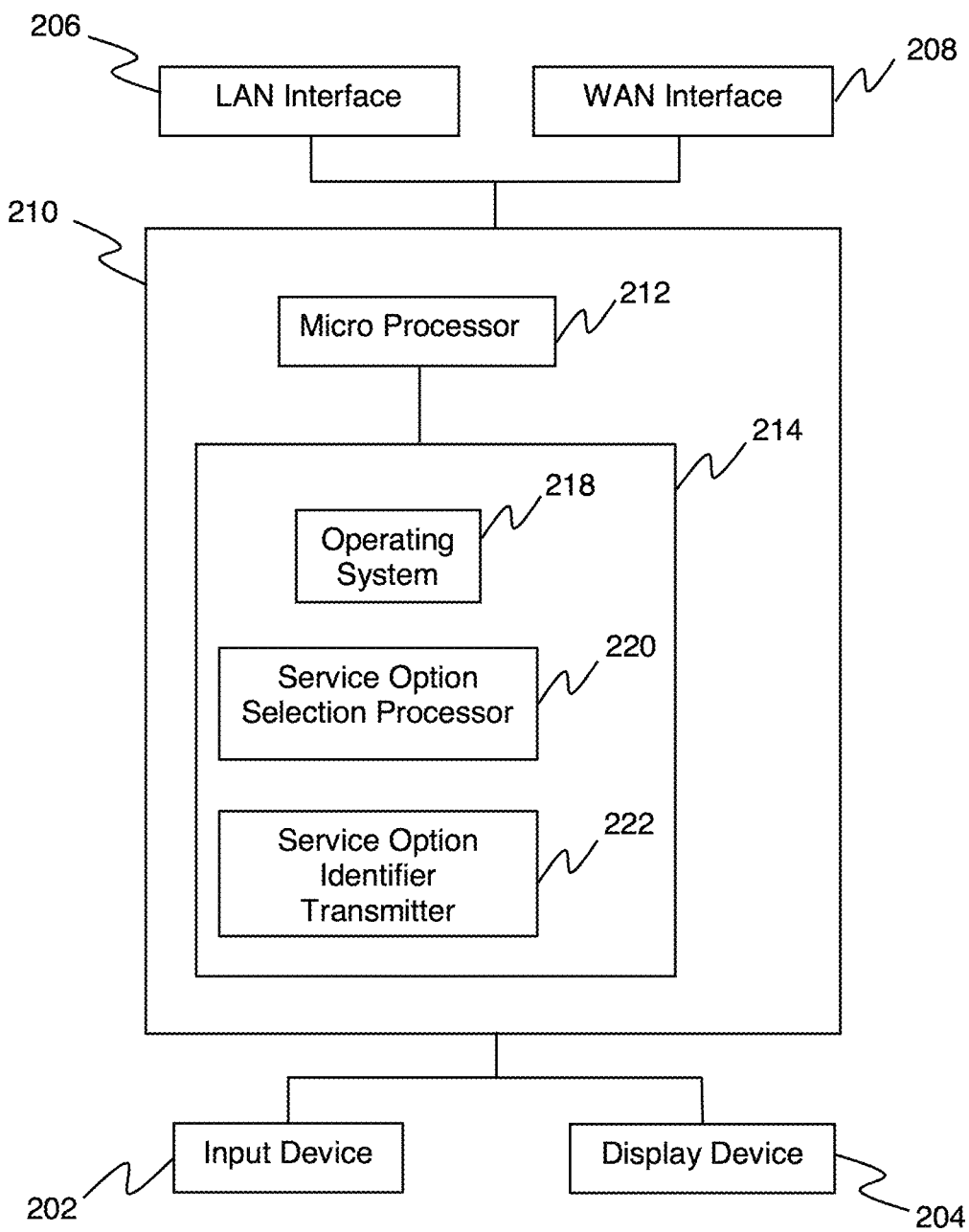
FIG. 2 is a schematic view of an exemplary first communications device.

As shown in FIG. 2, where the first communications device 200 is implemented as a POS terminal or a pin-pad device, the first communications device 200 may include an input device 202, a display device 204 and a local area network (LAN) interface 206. Independently of the implementation of the first communications device 200, the first communications device 200 may also include a wide area network (WAN) interface 208, and a data processing system 210 that is in communication with the input device 202 (if present), the display device 204 (if present), the LAN interface 206 (if present) and the WAN interface 208.

The input device 202 (if present) may be implemented as a keyboard, touchpad, touchscreen or other input device suitable for allowing the operator to input data and/or commands into the first communications device 200. The display device 204 (if present) may be implemented as a liquid crystal display (LCD) panel, plasma display panel, or other display device suitable for displaying information to the operator of the first communications device 200.

The LAN interface 206 (if present) interfaces the first communications device 200 with the second communications device 400. The LAN interface 206 may be configured as a wireless interface that allows the first communications device 200 to communicate directly with the second communications device 400 via a short-range wireless connection, such as a Bluetooth, or a Near Field Communications (NFC) connection, as examples. Alternately, the LAN interface 206 may be configured as a wired interface that allows the first communications device 200 to communicate directly with the second communications device 400 via a wired connection, such as a Universal Serial Bus (USB) connection, as an example.

The WAN interface 208 interfaces the first communications device 200 with the wide area network 140 and/or the mobile communications network 150, and allows the first communications device 200 to communicate with the first computer server 300 via the wide area network 140 and/or the mobile communications network 150. Further, where the first communications device 200 is implemented as a web server, the WAN interface 208 allows the first communications device 200 to communicate with the second communications device 400 via the wide area network 140.

The data processing system 210 includes a microprocessor 212 and a non-transient computer-readable medium 214. The non-transient computer-readable medium 214 may be provided as non-volatile electronic computer memory (e.g. FLASH memory), as an example. The non-transient computer-readable medium (memory) 214 may store a device identifier that is uniquely associated with the first communications device 200. The memory 214 may also store computer processing instructions which, when accessed from the memory 214 and executed by the microprocessor 212, implement at least an operating system 218, a service option selection processor 220 and a service option identifier transmitter 222.

The operating system 218 allows the first communications device 200 to accept user input from the input device 202 (if present) and to display information on the display device 204 (if present). The operating system 218 also allows the first communications device 200 to communicate with the first computer server 300 (via the WAN interface 208). Further, where the first communications device 200 is implemented as a web server, the operating system 218 also allows the first communications device 200 to communicate with the second communications device 400.

The operator of the first communications device 200 may use the first communications device 200 to initiate performance of a service provided by a service provider. The service option selection processor 220 may be configured to initiate performance for the service by, for example, transmitting to the first computer server 300 a service option selection message that includes a service option value that is associated with the service.

For example, the first communications device 200 may be associated with an in-store merchant (service provider), and the consumer (service recipient) may select an in-store service option (e.g. good or service that is available for purchase at the premises of the merchant). The service option selection processor 220 may initiate performance of the selected in-store service option by transmitting to the first computer server 300 a service option selection message that includes a service option value (e.g. payment amount required by the merchant for performance of the selected service option).

Alternately, the first communications device 200 may be associated with an online merchant (service provider), and the consumer (service recipient) may select an online service option (e.g. good or service that is available for purchase via the merchant's web server). The service option selection processor 220 may initiate performance of the selected online service option by transmitting to the first computer server 300 a service option selection message that includes a service option value (e.g. payment amount required by the merchant for performance of the selected service option).

In another example, the first communications device 200 is associated with an online or in-store loyalty points program (service provider), and a loyalty program participant (service recipient) selects a service option (e.g. loyalty points redemption offer that is available from the loyalty points program). The service option selection processor 220 may initiate performance of the selected service option by transmitting to the first computer server 300 a service option selection message that includes a service option value (e.g. number of loyalty points expected to be redeemed by the loyalty program participant).

The operator of the first communications device 200 may also use the first communications device 200 to confirm completion of a (first) milestone of the selected service option. The service option selection processor 220 may be configured to confirm completion of the first milestone by, for example, transmitting to the first computer server 300 (after transmitting the service option selection message) a first action notification message that includes a service option identifier that is uniquely associated with the service option (i.e. no other service option is associated with the service option identifier in the data processing network 100).

Continuing with the foregoing examples, the service option selection processor 220 may transmit the first action notification to the first computer server 300 after the operator of the first communications device 200 confirms (via the input device 202) that the merchant has shipped a good or has performed an initial service required by the selected service option, as examples.

The operator of the first communications device 200 may also use the first communications device 200 to provide the second communications device 400 with the service option identifier. Where the first communications device 200 is deployed in close proximity to the second communications device 400, the service option identifier transmitter 222 may be configured to provide the second communications device 400 with the service option identifier by, for example, generating a visual representation of the service option identifier (e.g. a two-dimensional bar code (QR code)) and displaying the visual representation on the display 204 for capture by the second communications device 400.

Alternately, where the first communications device 200 includes the LAN interface 206 (e.g. the first communications device 200 is implemented as a POS terminal or a pin-pad device), the service option identifier transmitter 222 may be configured to provide the second communications device 400 with the service option identifier by transmitting the service option identifier to the second communications device 400 via the LAN interface 206, over a short-range wireless connection or a wired connection established with the second communications device 400.

Where the first communications device 200 does not include the LAN interface 206 is not deployed in close proximity to the second communications device 400 (e.g. the first communications device 200 is implemented as a web server), the service option identifier transmitter 222 may be configured to provide the second communications device 400 with the service option identifier by transmitting the service option identifier to the second communications device 400 via the WAN interface 208.

First Computer Server

Figure 3:
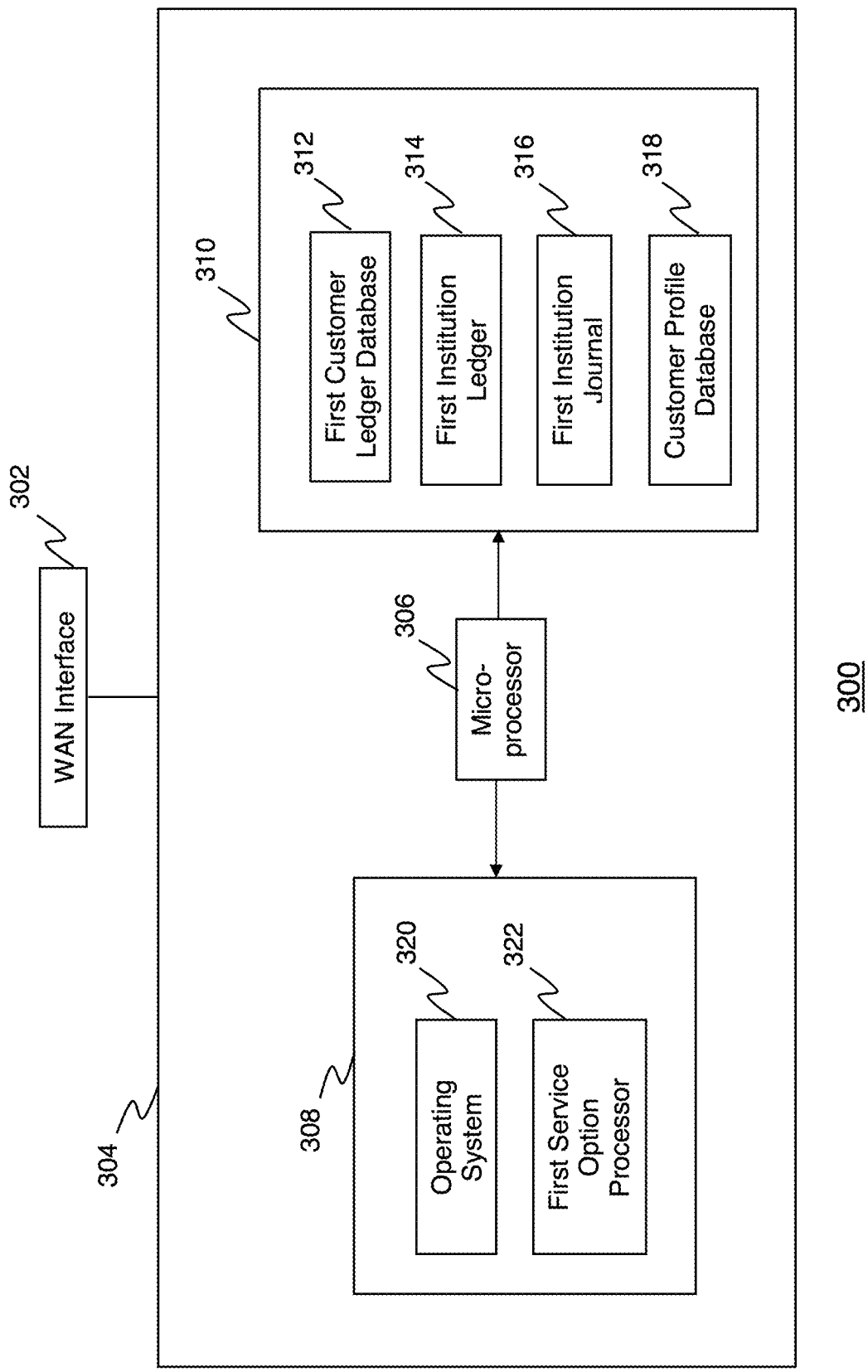
FIG. 3 is a schematic view of an exemplary first computer server.

The first computer server 300 may be associated with a business entity (first institution) with which the service provider is a customer. As shown in FIG. 3, the first computer server 300 includes a wide area network (WAN) interface 302, and a data processing system 304 that is in communication with the WAN interface 302.

The WAN interface 302 interfaces the first computer server 300 with the wide area network 140 and/or the mobile communications network 150, and allows the first computer server 300 to communicate with the first communications device 200 via the wide area network 140 and/or the mobile communications network 150. The WAN interface 302 also allows the first computer server 300 to communicate with the ledger server 600 via the wide area network 140.

The data processing system 304 includes one or more microprocessors 306, a volatile computer-readable memory 308 and a non-transient computer-readable medium 310. The non-transient computer-readable medium 310 may be provided as one or more of a magnetic storage drive and a solid-state drive.

The computer-readable medium 310 may store an institution identifier that is uniquely associated with the first institution. The computer-readable medium 310 may also store a (first) customer ledger database 312, a (first) institution ledger 314, a (first) institution journal 316, and a customer profile database 318. Alternately, the first customer ledger database 312, the first institution ledger 314, the first institution journal 316 and/or the customer profile database 318 may be deployed on a database server (not shown) that is distinct from the first computer server 300, and the first computer server 300 may be configured to access the first customer ledger database 312, the first institution ledger 314, the first institution journal 316 and/or the customer profile database 318 via a secure communications channel.

The first customer ledger database 312 may store a plurality of database records each uniquely associated with a respective (first) customer ledger and a respective (first) ledger identifier. Each database record of the first customer ledger database 312 identifies one of the first ledger identifiers, and deposit/withdrawal entries to the associated first customer ledger.

The first institution associated with the first computer server 300 may assign (or may authorize a third party to assign) respective ledger identifiers to customers of the first institution. Therefore, at least one of the first ledger identifiers (and the associated first customer ledger) may be uniquely associated with the service provider (i.e. each first ledger identifier and the associated first customer ledger is only associated with one customer of the first institution). The first institution may ensure that each first ledger identifier is unique by saving each new first ledger identifier in the first customer ledger database 312 only after confirming that the first institution has not previously saved the first ledger identifier in the first customer ledger database 312.

The first institution ledger 314 is associated with the (first) institution, and records deposit/withdrawal entries to the associated first institution ledger. The first institution journal 316 stores a plurality of database records each uniquely associated with a respective service option involving one of the customers of the first institution. Each database record of the first institution journal 316 identifies one or more deposit/withdrawal entries to one of the first customer ledgers and the corresponding withdrawal/deposit entries to the first institution ledger.

The customer profile database 318 may store a plurality of database records each uniquely associated with a respective customer of the first institution. Each database record of the customer profile database 318 stores the first ledger identifier associated with the customer, and one or more authentication credentials which the first computer server 300 can use to authenticate the customer. For example, one of the database records of the customer profile database 318 may store the device identifier of the first communications device 200, in association with the first ledger identifier.

The computer-readable medium 310 also maintains computer processing instructions stored thereon which, when copied into the volatile computer-readable memory 308, and executed by the microprocessor(s) 306 from the volatile computer-readable memory 308, implement at least an operating system 320 and a first service option processor 322.

The operating system 320 allows the first computer server 300 to at least communicate with the first computing device 200 and the ledger server 600 (via the WAN interface 302).

The first computer server 300 transforms service option selections (received from the first communications device 200) into service option initiations for subsequent processing by the ledger server 600. The first service option processor 322 may be configured to transform the service option selections by, for example, (a) receiving (from the first communications device 200) a service option selection message that includes at least a service option value; (b) generating a service option initiation message from the service option selection message; and (c) transmitting the service option initiation message to the ledger server 600.

The first service option processor 322 may generate the service option initiation message by incorporating the service option value into the service option initiation message. The first service option processor 322 may then request a service option identifier from the ledger server 600 by transmitting the service option initiation message to the ledger server 600. After receiving the requested service option identifier from the ledger server 600, the first service option processor 322 may transmit at least the service option identifier to the first communications device 200.

Alternately, the first service option processor 322 may generate the service option initiation message by generating a service option identifier, and incorporating the service option identifier and the service option value into the service option initiation message. The first service option processor 322 may then request confirmation of acceptance of the service option identifier by transmitting the service option initiation message to the ledger server 600. The first service option processor 322 may also transmit at least the service option identifier to the first communications device 200.

The first service option processor 322 may be further configured to transform the option selections by, for example, (a) receiving a (first) credential from the first communications device 200, (b) determining a (first) customer ledger from the (first) credential, and (c) associating the (first) customer ledger with the service option identifier.

As discussed, the customer profile database 318 may include a plurality of database records each uniquely associated with a respective customer of the first institution. One of these database records may store a (first) ledger identifier in association with one or more authentication credentials. The first service option processor 322 may determine the (first) customer ledger by (i) locating the database record that is associated with the service provider by querying the customer profile database 318 with the (first) credential(s) received from the first communications device 200, and (ii) extracting the (first) ledger identifier from the located database record.

The first service option processor 322 may associate the customer ledger with the service option identifier by saving the service option identifier in the customer profile database 318, in association with the (first) ledger identifier. In one implementation, the service option initiation message excludes the (first) credential and excludes particulars of the (first) customer ledger.

The first computer server 300 may also transform action notifications (received from the first communications device 200) into ledger update requests for subsequent processing by the ledger server 600. The first service option processor 322 may be configured to transform the action notifications by, for example, (a) receiving from the first communications device 200 an action notification that includes a service option identifier, and (b) transmitting to the ledger server 600 a ledger update request that includes the service option identifier but excludes the (first) credential and excludes particulars of the first customer ledger.

The first computer server 300 may also process ledger update authorizations received from the ledger server 600. The first service option processor 322 may be configured to process the ledger update authorizations by, for example, (a) receiving a ledger update authorization from the ledger server 600; (b) determining the (first) customer ledger from the ledger update authorization; (c) updating a transaction journal with a transaction journal entry that identifies a release of funds (from the (first) institution journal 316) into the (first) customer ledger, and (d) optionally transmitting to the first communications device 200 a notification that confirms the release of funds.

As discussed, one of the database records of the customer profile database 318 may store a (first) ledger identifier in association with a service option identifier. The ledger update authorization may include a service option identifier, and the first service option processor 322 may determine the (first) customer ledger by (i) locating the database record associated with the customer by querying the customer profile database 318 with the service option identifier included with the ledger update authorization, and (ii) extracting the (first) ledger identifier from the located database record.

Second Communications Device

The second communications device 400 is typically associated with a service recipient, and may be implemented as a wireless communications device, such as a portable digital assistant (PDA), a tablet computer or a smartphone. Alternately, the second communications device 400 may be implemented as a wired communications device, such as a personal computer.

Figure 4:
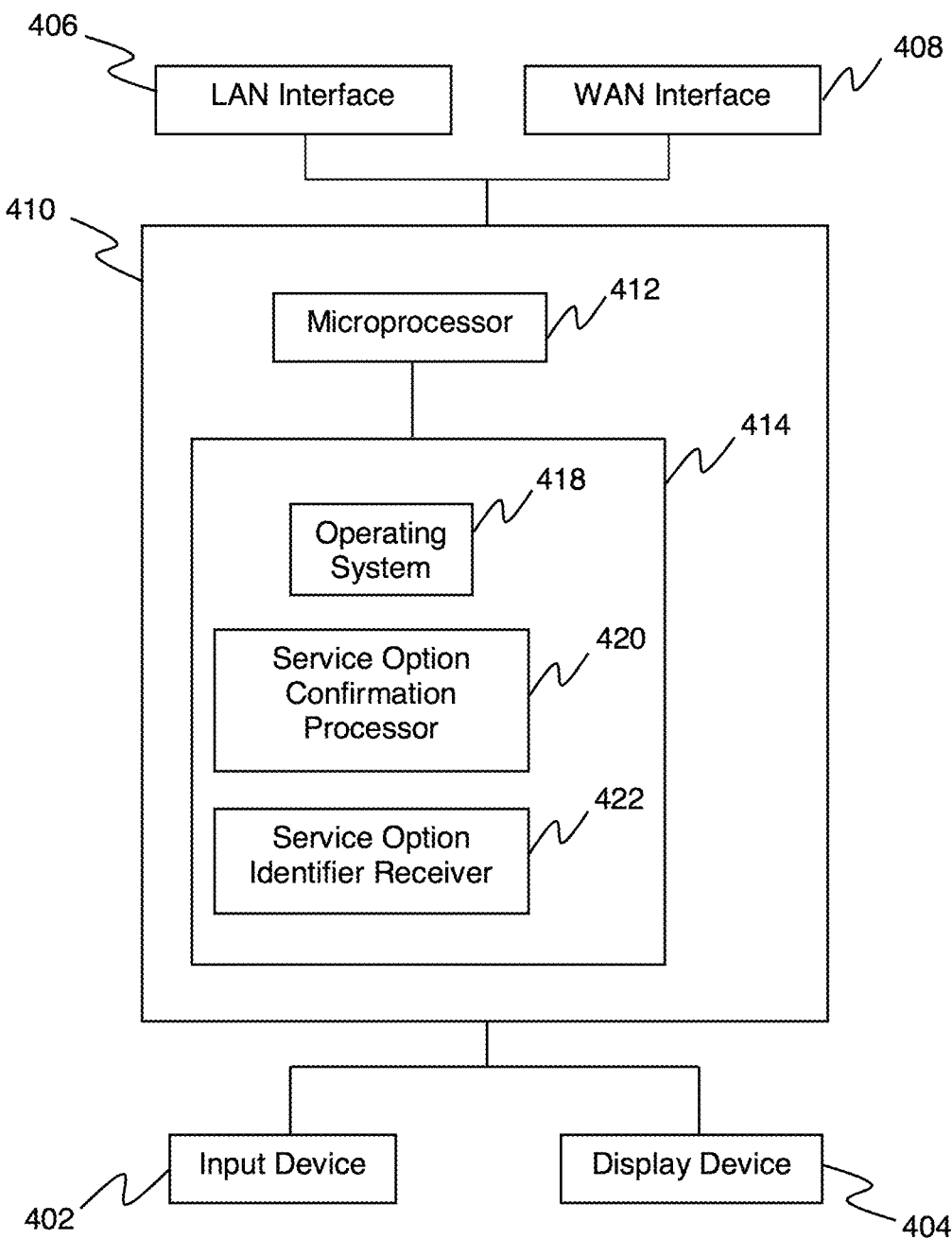
FIG. 4 is a schematic view of an exemplary second communications device.

As shown in FIG. 4, the second communications device 400 may include an input device 402, a display device 404, a wide area network (WAN) interface 408, and a data processing system 410 that is in communication with the input device 402, the display device 404 and the WAN interface 408. Where the first communications device 200 is implemented as a wireless communications device, the second communications device 400 may also include a local area network (LAN) interface 406 and an image capture device (e.g. CCD image sensor) 409 that is communication with the data processing system 410.

The input device 402 may be implemented as a keyboard, touchpad, touchscreen or other input device suitable for allowing the operator to input data and/or commands into the second communications device 400. The display device 404 may be implemented as a liquid crystal display (LCD) panel, plasma display panel, or other display device suitable for displaying information to the operator of the second communications device 400.

The LAN interface 406 (if present) interfaces the second communications device 400 with the first communications device 200. The LAN interface 406 may be configured as a wireless interface that allows the second communications device 400 to communicate directly with the first communications device 200 via a short-range wireless connection, such as a Bluetooth, or a Near Field Communications (NFC) connection, as examples. Alternately, the LAN interface 406 may be configured as a wired interface that allows the second communications device 400 to communicate directly with the first communications device 200 via a wired connection, such as a Universal Serial Bus (USB) connection, as an example.

The WAN interface 408 interfaces the second communications device 400 with the wide area network 140 and/or the mobile communications network 150, and allows the second communications device 400 to communicate with the second computer server 500. Further, where the first communications device 200 is implemented as a web server, the WAN interface 408 allows the second communications device 400 to communicate with the first communications device 200 via the wide area network 140.

The data processing system 410 includes a microprocessor 412 and a non-transient computer-readable medium 414. The non-transient computer-readable medium 414 may be provided as non-volatile electronic computer memory (e.g. FLASH memory), as an example. The non-transient computer-readable medium (memory) 414 may store a device identifier that is uniquely associated with the second communications device 400. The memory 414 may also store computer processing instructions which, when accessed from the memory 414 and executed by the microprocessor 412, implement at least an operating system 418, a service option confirmation processor 420 and a service option identifier receiver 422.

The operating system 418 allows the second communications device 400 to accept user input from the input device 402 and to display information on the display device 404. The operating system 418 also allows the second communications device 400 to communicate with the first communications device 200 via the LAN interface 406 (if present), and to communicate with the first communications device 200 via the WAN interface 408 (where the first communications device 200 is implemented as a web server). Further, the operating system 418 allows the second communications device 400 to communicate with the second computer server 500 (via the WAN interface 408).

The operator of the second communications device 400 may also use the second communications device 400 to receive a unique service option identifier from the first communications device 200. Where the first communications device 200 is configured to display a visual representation of the service option identifier on the display 204, and the second communications device 400 is deployed in close proximity to the first communications device 200, the service option identifier receiver 422 may be configured to receive the service option identifier from the first communications device 200 by capturing the visual representation via the image capture device 409 (if present), and recovering the service option identifier from the captured image.

Alternately, where the second communications device 400 includes the LAN interface 406, the service option identifier receiver 422 may be configured to receive the service option identifier from the first communications device 200 via the LAN interface 206, over a short-range wireless connection or a wired connection established with the first communications device 200.

Where the second communications device 400 does not include the LAN interface 406 or is not deployed in close proximity to the first communications device 200 (e.g. the first communications device 200 is implemented as a web server), the service option identifier receiver 422 may be configured to receive the service option identifier from the first communications device 200 via the WAN interface 408.

The operator of the second communications device 400 may also use the second communications device 400 to initiate authorization for a service. The service option confirmation processor 420 may be configured to initiate authorization for the service by receiving from the first communications device 200 (i) a service option identifier that is uniquely associated with a service option (i.e. no other service option is associated with the service option identifier within the data processing network 100), and (ii) an authorization value, and transmitting to the second computer server 500 a service option confirmation message that includes the service option identifier and the associated authorization value.

Continuing with the foregoing examples, the service option confirmation processor 420 may initiate authorization for a service option provided by a merchant (online, in-store) by transmitting to the second computer server 500 a service option confirmation message that includes (i) the unique service option identifier associated with the goods/services selected, and (ii) the payment amount (authorization value) for the goods/services selected. Alternately, the service option confirmation processor 420 may initiate authorization for a service option provided by a loyalty points program (online, in-store) by transmitting to the second computer server 500 a service option confirmation message that includes (i) the unique service option identifier associated with the loyalty points redemption offer selected, and (ii) the number of loyalty points (authorization value) being redeemed.

After a (second) milestone of the selected service option has been completed, the operator of the second communications device 400 may use the second communications device 400 to confirm completion of the second milestone. The service option confirmation processor 420 may be configured to confirm completion of the second milestone by transmitting to the second computer server 500 (after transmitting the service option confirmation message) a second action notification message that includes the unique service option identifier.

Continuing with the foregoing examples, the service option confirmation processor 420 may transmit the second action notification to the second computer server 500 after the operator of the second communications device 400 confirms (via the input device 402) that the service recipient has received the goods or services from the merchant, as an example.

Second Computer Server

Figure 5:
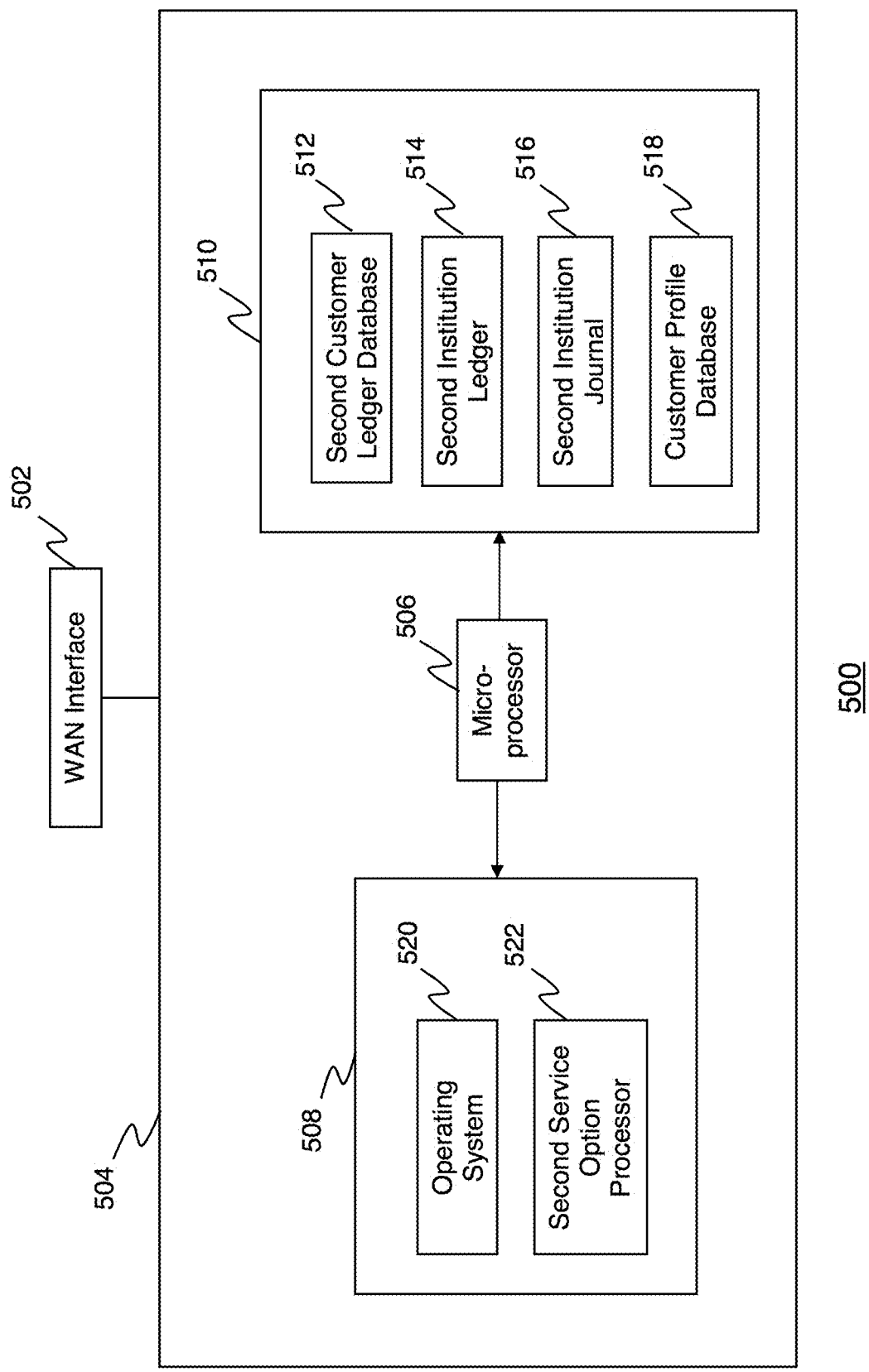
FIG. 5 is a schematic view of an exemplary second computer server.

The second computer server 500 may be associated with a business entity (second institution) with which the service recipient is a customer. As shown in FIG. 5, the second computer server 500 includes a wide area network (WAN) interface 502, and a data processing system 504 that is in communication with the WAN interface 502.

The WAN interface 502 interfaces the second computer server 500 with the wide area network 140 and/or the mobile communications network 150, and allows the second computer server 500 to communicate with the second communications device 400 via the wide area network 140 and/or the mobile communications network 150. The WAN interface 502 also allows the second computer server 500 to communicate with the ledger server 600 via the wide area network 140.

The data processing system 504 includes one or more microprocessors 506, a volatile computer-readable memory 508 and a non-transient computer-readable medium 510. The non-transient computer-readable medium 510 may be provided as one or more of a magnetic storage drive and a solid-state drive.

The computer-readable medium 510 may store an institution identifier that is uniquely associated with the second institution. The computer-readable medium 310 may also store a (second) customer ledger database 512, a (second) institution ledger 314, a (second) institution journal 516, and a customer profile database 518. Alternately, the second customer ledger database 512, the second institution ledger 514, the second institution journal 516 and/or the customer profile database 518 may be deployed on a database server (not shown) that is distinct from the second computer server 500, and the second computer server 500 may be configured to access the second customer ledger database 512, the second institution ledger 514, the second institution journal 516 and/or the customer profile database 518 via a secure communications channel.

The second customer ledger database 512 may store a plurality of database records each uniquely associated with a respective (second) customer ledger and a respective (second) ledger identifier. Each database record of the second customer ledger database 512 identifies one of the second ledger identifiers, and deposit/withdrawal entries to the associated second customer ledger.

The second institution associated with the second computer server 500 may assign (or may authorize a third party to assign) respective ledger identifiers to customers of the second institution. Therefore, at least one of the second ledger identifiers (and the associated second customer ledger) may be uniquely associated with the service provider (i.e. each second ledger identifier and the associated second customer ledger is only associated with one customer of the second institution). The second institution may ensure that each second ledger identifier is unique by saving each new second ledger identifier in the second customer ledger database 512 only after confirming that the second institution has not previously saved the second ledger identifier in the second customer ledger database 512.

The second institution ledger 514 is associated with the (second) institution, and records deposit/withdrawal entries to the associated second institution ledger. The second institution journal 516 stores a plurality of database records each uniquely associated with a respective service involving one of the customers of the second institution. Each database record of the second institution journal 516 identifies one or more deposit/withdrawal entries to one of the second customer ledgers and the corresponding withdrawal/deposit entries to the second institution ledger.

The customer profile database 518 may store a plurality of database records each uniquely associated with a respective customer of the second institution. Each database record of the customer profile database 518 stores the second ledger identifier associated with the customer, and one or more authentication credentials which the second computer server 500 can use to authenticate the customer. For example, one of the database records of the customer profile database 518 may store the device identifier of the second communications device 400, in association with the second ledger identifier.

The computer-readable medium 510 also maintains computer processing instructions stored thereon which, when copied into the volatile computer-readable memory 508, and executed by the microprocessor(s) 506 from the volatile computer-readable memory 508, implement at least an operating system 520 and a second service option processor 522.

The operating system 520 allows the second computer server 500 to at least communicate with the second computing device 400 and the ledger server 600 (via the WAN interface 502).

The second computer server 500 transforms service option confirmations (received from the second communications device 400) into service option authorizations for subsequent processing by the ledger server 600. The second service option processor 522 may be configured to transform the service option confirmations by, for example, (a) receiving (from the second communications device 400) a service option confirmation message that includes a service option identifier and an associated authorization value; (b) incorporating the service option identifier and the authorization value into a service option authorization message, and (c) transmitting the service option authorization message to the ledger server 600.

The second service option processor 522 may be further configured to transform the service option confirmations by, for example, (a) receiving a (second) credential from the second communications device 400, (b) determining a (second) customer ledger from the (second) credential, (c) associating the (second) customer ledger with the service option identifier, and (d) updating the (second) institution journal 516 with a journal entry identifying a transfer from the (second) customer ledger (into the second institution ledger 514) in an amount equal to the authorization value.

As discussed, the customer profile database 518 may include a plurality of database records each uniquely associated with a respective customer of the second institution. One of these database records may store a (second) ledger identifier in association with one or more authentication credentials. The second service option processor 522 may determine the (second) customer ledger by (i) locating the database record associated with the service recipient by querying the customer profile database 518 with the (second) credential(s) received from the second communications device 400, and (ii) extracting the (second) ledger identifier from the located database record.

The second service option processor 522 may associate the customer ledger with the service option identifier by saving the service option identifier in the customer profile database 518, in association with the (second) ledger identifier. In one implementation, the service option authorization message excludes the (second) credential and excludes particulars of the (second) customer ledger.

The second computer server 500 may also transform action notifications (received from the second communications device 400) into ledger update requests for subsequent processing by the ledger server 600. The second service option processor 522 may be configured to transform the action notifications by, for example, (a) receiving from the second communications device 400 an action notification that includes a service option identifier, and (b) transmitting to the ledger server 600 a ledger update request that includes the service option identifier but excludes the (second) credential and excludes particulars of the second customer ledger (and the first customer ledger).

Ledger Server

As shown in FIG. 6, the ledger server 600 includes a wide area network (WAN) interface 602, and a data processing system 604 that is in communication with the WAN interface 602.

The WAN interface 602 interfaces the ledger server 600 with the wide area network 140, and allows the ledger server 600 to communicate with the first computer server 300 and the second computer server 500 via the wide area network 140.

The data processing system 604 includes one or more microprocessors 606, a volatile computer-readable memory 608 and a non-transient computer-readable medium 610. The non-transient computer-readable medium 610 may be provided as one or more of a magnetic storage drive and a solid-state drive.

The computer-readable medium 610 may store a institution ledger database 612, a service option database 614, a settlement journal 616 and an institution profile database 618. Alternately, the institution ledger database 612, the service option database 614, the settlement journal 616 and/or the institution profile database 618 may be deployed on a database server (not shown) that is distinct from the ledger server 600, and the ledger server 600 may be configured to access the institution ledger database 612, the service option database 614, the settlement journal 616 and/or the institution profile database 618 via a secure communications channel.

The institution ledger database 612 may store a plurality of database records each uniquely associated with a respective institution ledger and a respective institution ledger identifier. Each database record of the institution ledger database 612 is associated with a respective institution, and identifies one of the institution ledger identifiers and deposit/withdrawal entries to the associated institution ledger. Therefore, one of the database records of the institution ledger database 612 may identify a (first) institution ledger identifier and may store a (first) institution ledger that is associated with the first institution. Another of the database records of the institution ledger database 612 may identify a (second) institution ledger identifier and may store a (second) institution ledger that is associated with the second institution.

The service option database 614 stores a plurality of database records each associated with a respective service option. Each database record of the service option database 614 stores the service option identifier of a service option in association with at least the service option value of the service option. One of more of the database records may also include a status field that identifies a characteristic of the associated service option. For example, the status field may include a status parameter that indicates whether the associated service option was selected online (i.e. the first communications device 200 is implemented as a web server) or was selected at the service provider's business premises (i.e. the first communications device 200 is implemented as a POS terminal or as a pin-pad device).

The settlement journal 616 stores a plurality of database records each uniquely associated with a respective transaction between the first institution and the second institution. Each database record of the settlement journal 616 identifies one or more deposit/withdrawal entries to the first institution ledger and the corresponding withdrawal/deposit entries to the second institution ledger.

The institution profile database 618 may store a plurality of database records each uniquely associated with a respective institution. Each database record of the institution profile database 618 stores the institution ledger identifier associated with the institution, and one or more authentication credentials which the institution can use to authenticate to the ledger server 600. For example, one of the database records of the institution profile database 618 may store the (first) institution ledger identifier in association with the institution identifier of the first institution. Another of the database records of the institution profile database 618 may store the (second) institution ledger identifier in association with the institution identifier of the second institution.

The computer-readable medium 610 also maintains computer processing instructions stored thereon which, when copied into the volatile computer-readable memory 608, and executed by the microprocessor(s) 606 from the volatile computer-readable memory 608, implement at least an operating system 620 and a ledger processor 622.

The operating system 620 allows the ledger server 600 to at least communicate with the first computer server 300 and the second computer server 500 (via the WAN interface 602).

The ledger server 600 transforms service option initiations (received from the first computer server 300) and service option authorizations (received from the second computer server 500) into institution ledger transfers. The ledger processor 622 may be configured to transform the service option initiations and authorizations by, for example:

(a) receiving (from the first computer server 300) at least one service option initiation message (that includes a service option identifier and an associated service option value), (b) for each service option initiation message, saving the service option identifier, in a database record of the service option database 614, in association with the service option value, (c) receiving (from the second computer server 500) at least one service option authorization message (that includes a service option identifier and an associated authorization value), (d) for each service option authorization message, validating one of the service option initiation messages, and (e) updating the settlement journal 616 with a journal entry identifying a transfer between the first institution ledger and the second institution ledger in an amount equal to a sum of the service option values of the validated service option initiation messages.

The ledger processor 622 may validate one of the service option initiation messages by (i) locating, in the service option database 614, the database record that includes the service option identifier of the service option authorization message, and (ii) confirming that the service option value in the located database record matches the authorization value of the service option authorization message.

The ledger processor 622 may also update the located database record with a confirmation database entry that confirms that the service option value of the located database record matches the authorization value of the service option authorization message.

The ledger processor 622 may be further configured to validate one of the service option initiation messages by, for example, prior to updating the settlement journal 616:

(i) receiving from the first computer server 300 a first ledger update request that includes a service option identifier, (ii) locating in the service option database 614 the database record that includes the service option identifier, (iii) confirming that the located database record includes the confirmation database entry, (iv) determining a first transfer amount (less than the service option value of the located database record), and (v) transmitting to the first computer server 300 a first ledger update authorization that includes the service option identifier and authorizes a first release of funds in an amount equal to the first transfer amount.

The ledger processor 622 may be further configured to validate one of the service option initiation messages by, for example, prior to updating the settlement journal 616:

(vi) receiving from the second computer server 500 a second ledger update request that includes the service option identifier, (vii) locating in the service option database 614 the database record that includes the service option identifier, (viii) confirming that the located database record includes the confirmation database entry, (ix) determining a second transfer amount from a difference between the first transfer amount and the service option value of the located database record; and (x) transmitting to the first computer server 300 a second ledger update authorization that includes the service option identifier and authorizes a second release of funds in an amount equal to the second transfer amount.

Method of Settling Institution Ledgers

As discussed, the data processing network 100 implements a method of settling institution ledgers. A sample embodiment of the institution ledger settlement method will be discussed with reference to FIGS. 7a and 7b. As will be explained, in this embodiment, the ledger server 600 receives at least one service option initiation message from the first computer server 300. Each service option initiation message includes a service option identifier and an associated service option value. For each service option initiation message, the ledger server 600 saves the service option identifier, in a database record of the service option database 614, in association with the service option value.

The ledger server 600 also receives at least one service option authorization message from the second computer server 500. Each service option authorization message includes a service option identifier and an associated authorization value. For each service option authorization message, the ledger server 600 validates one of the service option initiation messages by (i) locating, in the service option database 614, the database record that includes the service option identifier of the service option authorization message, and (ii) confirming that the service option value in the located database record matches the authorization value of the service option authorization message.

The ledger server 600 then updates the settlement journal 616 with a journal entry that identifies a transfer between the first institution ledger (associated with the first institution) and the second institution ledger (associated with the second institution) in an amount that is equal to a sum of the service option values of the validated service option initiation messages.

An example institution ledger settlement method will now be discussed in detail with reference to FIGS. 7a and 7b. In the following example, a customer of the first institution is in possession of a first communications device 200, and a customer of the second institution is in possession of a second communications device 400. The customer (service provider) of the first institution provides a service to the customer (service recipient) of the second institution.

The memory 214 of the first communications device 200 may store a private cryptographic key that is uniquely associated with the first communications device 200, and may also store a public certificate that includes a corresponding public cryptographic key (i.e. the private cryptographic key assigned to the first communications device 200 and the public cryptographic key are an asymmetric cryptographic key pair).

Similarly, the memory 414 of the second communications device 400 may store a private cryptographic key that is uniquely associated with the second communications device 400, and may also store a public certificate that includes a corresponding public cryptographic key (i.e. the private cryptographic key assigned to the second communications device 400 and the associated public cryptographic key are an asymmetric cryptographic key pair).

The first computer server 300 is administered by the first institution, and maintains a (first) customer ledger (in the first customer ledger database 312) for the service provider and a (first) institution ledger 314 for the first institution. The first computer server 300 also maintains a customer profile database 318 that stores a first ledger identifier that is uniquely associated with the service provider's ledger, and one or more authentication credentials that are uniquely associated with the service provider.

The second computer server 500 is administered by the second institution, and maintains a (second) customer ledger (in the second customer ledger database 512) for the service recipient and a (second) institution ledger 514 for the second institution.

The second computer server 500 also maintains a customer profile database 518 that stores a second ledger identifier that is uniquely associated with the service recipient's ledger, and one or more authentication credentials that are uniquely associated with the service recipient.

(i) Initiate Performance of Service with Service Provider

At the outset of the method, the first communications device 200 initiates performance of a service with the service provider by transmitting to the first computer server 300 a service option selection message that includes a service option value.

As discussed above, the first communications device 200 may be implemented as a POS terminal or a pin-pad device, and the service provider may be a merchant that has available one or more in-store service options (e.g. goods and/or services for purchase at the premises of the service provider, and an associated payment amount required by the service provider). Alternately, the service provider may implement an in-store loyalty points program that has available one or more in-store service options (e.g. loyalty points redemption offers and the associated number of loyalty points expected to be redeemed by the loyalty program participant).

In either implementation, the service recipient may attend at the premises of the service provider, and may select one of the available in-store service options and notify the service provider of the selected in-store service option, at step S700. The operator (e.g. merchant) of the first communications device 200 may input the payment amount (service option value) or loyalty points amount (service option value) for the selected service option into the first communications device 200 (e.g. via the input device 202, and the first communications device 200 may initiate performance of the selected service option, at step S702, by transmitting to the first computer server 300, via the wide area network 140 or the mobile communications network 150, a service option selection message that includes the payment amount (loyalty points amount) of the selected service option.

Alternately, as discussed above, the first communications device 200 may be implemented as a web server, and the first communications device 200 may host one or more web pages that identify one or more online service options. In this alternate implementation, the service recipient may use the second communications device 400 to establish a communications session with the first communications device 200 via the wide area network 140, and may use the second communications device 400 to select one of the available online service options.

For example, as discussed, the service provider may provide an online merchant service, and the first communications device 200 may implement one or more web pages that identify various online service options (e.g. goods and/or services, and associated payment amount and delivery time frames) that are available from the online merchant service. In this example, the service recipient may select one of the online service options, and may use the second communications device 400 to transmit particulars of the selected online service option to the first communications device 200 via the wide area network 140, at step S700. The first communications device 200 may then initiate performance of the selected service option, at step S702, by transmitting to the first computer server 300, via the wide area network 140 or the mobile communications network 150, a service option selection message that includes the payment amount (service option value) of the selected service option.

In another example, the service provider may provide an online loyalty points program, and the first communications device 200 may implement one or more web pages that identify various online service options (e.g. loyalty points redemption offers that are available from the loyalty points program). In this example, the service recipient may select one of the online service options, and may use the second communications device 400 to transmit particulars of the selected online service option to the first communications device 200 via the wide area network 140, at step S700. The first communications device 200 may then initiate performance of the selected service option, at step S702, by transmitting to the first computer server 300, via the wide area network 140 or the mobile communications network 150, a service option selection message that includes a service option value (e.g. number of loyalty points expected to be redeemed by the loyalty program participant).

One or more of the online service options identified on the service provider's web page(s) may identify one or more performance parameters (e.g. milestones and associated partial payment amounts that the service provider is entitled to receive upon fulfillment of the associated milestone). Therefore, the service option selection message may also specify the performance parameter(s), if any, associated with the selected online service option. Further, the service option selection message may also include a status parameter that indicates whether the associated service option was selected online or at the service provider's business premises.

The service option selection message may also include one or more (first) credentials that are associated with the operator (e.g. merchant) of the first communications device 200. Preferably, the device identifier of the first communications device 200 is uniquely associated with the operator, and the service option selection message includes at least the device identifier of the first communications device 200 as one credential. Alternately, the first communications device 200 may transmit the (first) credentials (e.g. device identifier) to the first computer server 300 separately from the service option selection message.

Independently of whether the first communications device 200 transmits the (first) credentials together with, or separately from, the service option selection message, for enhanced security the first communications device 200 may digitally sign the (first) credentials with the private cryptographic key assigned to the first communications device 200, and may transmit the signed credentials to the first computer server 300 together with the associated public certificate.

After the first computer server 300 receives the signed credentials from the first communications device 200, the first computer server 300 may validate the signed credentials by using the public cryptographic key (included in the provided public certificate) to confirm that the (first) credentials were signed using the private cryptographic key assigned to the first communications device 200. Validation of the signed credentials provides the first computer server 300 with an enhanced level of confidence that the first computer server 300 is actually in communication with the first communications device 200, and that the (first) credentials are not being used by a third party.

After the first computer server 300 validates the (first) credentials received from the first communications device 200, the first computer server 300 may determine a first customer ledger from the (first) credential(s). As discussed, one of the database records of the customer profile database 318 may store a first ledger identifier in association with one or more authentication credentials. Therefore, the first computer server 300 may determine the first customer ledger by (i) querying the customer profile database 318 with the (first) credential(s) received from the first communications device 200 for the database record that is associated with the service provider, and (ii) extracting the first ledger identifier from the located database record.

After the first computer server 300 receives the service option selection message from the first communications device 200, the first computer server 300 generates a service option initiation message from the service option selection message and transmits the service option initiation message to the ledger server 600 via the wide area network 140 and/or the mobile communications network 150. The service option initiation message includes at least the service option value and the institution identifier of the first institution and may also include the associated performance parameter(s) and status parameter (if any).

The service option selection message may also include one or more (first institution) credentials that are associated with the first institution. Preferably, the institution identifier of the first computer server 300 is uniquely associated with the first institution, and the service option initiation message includes the first institution identifier of the first computer server 300 (first institution identifier). Alternately, the first computer server 300 may transmit the (first institution) credential (e.g. first institution identifier) to the ledger server 600 separately from the service option selection message.

The service option initiation message may request a service option identifier from the ledger server 600, and the first computer server 300 may incorporate the service option value into the service option initiation message and transmit the service option initiation message to the ledger server 600, at step S704. In response to the service option initiation message, the ledger server 600 may generate a service option identifier, save the service option identifier and the service option value in the service option database 614 (together with the associated performance parameter(s) and status parameter, if any), and transmit the service option identifier to the first computer server 300, at step S706.

Preferably, the service option identifier is uniquely associated with the selected service option (i.e. no other service option is associated with the service option identifier within the data processing network 100). The ledger server 600 may ensure that the service option identifier is uniquely associated with the selected service option, for example, by using a noise generator or a pseudo-random number generator to generate the service option identifier, and saving the service option identifier in the service option database 614 only after confirming that the ledger server 600 has not previously saved the service option identifier in the service option database 614.

Alternately, the service option initiation message may request confirmation of acceptance of a service option identifier, and the first computer server 300 may generate a service option identifier and incorporate the service option identifier and the service option value into the service option initiation message and transmit the service option initiation message to the ledger server 600, at step S704. In response to the service option initiation message, the ledger server 600 may save the service option identifier and the service option value in the service option database 614 (together with the associated performance parameter(s) and status parameter, if any), after confirming that the ledger server 600 has not previously saved the service option identifier in the service option database 614, and may respond to the first computer server 300 with an acknowledgement message, at step S706.

The first computer server 300 may ensure that the service option identifier is uniquely associated with the selected service option, for example, by using a noise generator or a pseudo-random number generator to generate the service option identifier, and prefixing/appending the output of the number generator with an identifier that is uniquely associated with the first institution.

After the ledger server 600 receives the (first institution) credential from the first computer server 300, the ledger server 600 may also determine the first institution ledger from the (first institution) credential. The ledger server 600 may determine the first institution ledger by (i) querying the institution profile database 618 with the (first institution) credential(s) received from the first computer server 300 for the database record that is associated with the first institution, and (ii) extracting the first institution ledger identifier from the located database record. The ledger server 600 may then store the first institution ledger identifier in the service option database 614, in association with the service option identifier, thereby identifying the first institution as the service provider for the service option.

After the first computer server 300 receives the service option identifier (or the acknowledgement message) from the ledger server 600, the first computer server 300 may associate the first customer ledger with the service option identifier by saving the service option identifier in the customer profile database 318, in association with the first ledger identifier.

At step S708, the first computer server 300 transmits the service option identifier to the first communications device 200. Preferably, both the service option selection message (transmitted to the first computer server 300 at step S702) and the service option initiation message (transmitted to the ledger server 600 at step S704) both exclude particulars of the first customer ledger. Further, preferably the service option initiation message excludes the (first) credential(s) of the service provider.

(ii) Provide Service Recipient With Service Option Identifier

After the first communications device 200 receives the service option identifier from the first computer server 300, the service provider provides the service recipient with the service option identifier.

If the second communications device 400 is deployed in close proximity to the first communications device 200 (e.g. the service recipient is in attendance at the premises of the service provider), the first communications device 200 may provide the service recipient with the service option identifier by generating a visual representation of the service option identifier (e.g. a two-dimensional bar code (QR code)) and displaying the visual representation on the display 204 of the first communications device 200. The second communications device 400 may receive the service option identifier, at step S710, by capturing the visual representation via the image capture device 409 and recovering the service option identifier from the captured image.

Alternately, the first communications device 200 may provide the service recipient with the service option identifier by transmitting the service option identifier to the second communications device 400 via the LAN interface 206. The second communications device 400 may receive the service option identifier, at step S710, via the LAN interface 406.

If the second communications device 400 is deployed remotely from the second communications device 400 (e.g. the first communications device 200 is implemented as a web server), the first communications device 200 may provide the service recipient with the service option identifier by transmitting the service option identifier to the second communications device 400 via the WAN interface 208. The second communications device 400 may receive the service option identifier, at step S710, via the WAN interface 408.

(iii) Initiate Authorization of Service with Service Provider

After the second communications device 400 receives the service option identifier from the first communications device 200, the second communications device 400 initiates authorization of the service with the service provider by transmitting to the second computer server 500 a service option confirmation message that includes the service option identifier and an authorization value. The service option confirmation message may also include a status parameter that indicates whether the associated service option was selected online or at the service provider's business premises.

As discussed above, the service provider may be a merchant that has available (in-store or online) one or more goods and/or services, and the selected service option may identify the goods and/or services selected and the associated required payment amount. Alternately, the service provider may implement a loyalty points program that has available (in-store or online) one or more loyalty points redemption offers, and the selected service option may identify the loyalty points redemption offer selected and the associated number of loyalty points expected to be redeemed by the loyalty program participant. In this implementation, the operator of the second communications device 400 may input a payment amount (authorization value) or loyalty points amount (authorization value) for the selected service option into the second communications device 400 (e.g. via the input device 402). The operator may also input a status parameter (e.g. via the input device 402) that indicates whether the associated service option was selected online or at the service provider's business premises.

After the second communications device 400 receives the authorization value (e.g. payment amount, loyalty points amount) and optionally the status parameter, the second communications device 400 initiates authorization for the selected service option, at step S712, by transmitting to the second computer server 500, via the wide area network 140 or the mobile communications network 150, a service option confirmation message that includes the service option identifier, and also includes the authorization value and the status parameter (if any) that were input to the second communications device 400.

The service option confirmation message may also include one or more (second) credentials that are associated with the operator of the second communications device 400. Preferably, the device identifier of the second communications device 400 is uniquely associated with the operator, and the service option confirmation message includes the device identifier of the second communications device 400 as one (second) credential. Alternately, the second communications device 400 may transmit the (second) credentials (e.g. device identifier) to the second computer server 500 separately from the service option confirmation message.

Independently of whether the second communications device 400 transmits the (second) credentials together with, or separately from, the service option confirmation message, for enhanced security the second communications device 400 may digitally sign the (second) credentials with the private cryptographic key assigned to the second communications device 400, and may transmit the signed credentials to the second computer server 500 together with the associated public certificate.

After the second computer server 500 receives the signed credentials from the second communications device 400, the second computer server 500 may validate the signed credentials by using the public cryptographic key (included in the provided public certificate) to confirm that the (second) credentials were signed using the private cryptographic key assigned to the second communications device 400. Validation of the signed credentials provides the second computer server 500 with an enhanced level of confidence that the second computer server 500 is actually in communication with the second communications device 400, and that the (second) credentials are not being used by a third party.

After the second computer server 500 validates the signed credentials received from the second communications device 400, the second computer server 500 may determine a second customer ledger from the (second) credential(s), and associate the second customer ledger with the service option identifier.

As discussed, one of the database records of the customer profile database 518 may store a second ledger identifier in association with one or more authentication credentials. Therefore, the second computer server 500 may determine the second customer ledger by (i) querying the customer profile database 518 with the (second) credential(s) received from the second communications device 400 for the database record that is associated with the service recipient, and (ii) extracting the second ledger identifier from the located database record. The second computer server 500 may associate the second customer ledger with the service option identifier by saving the service option identifier in the customer profile database 518, in association with the second ledger identifier.

After the second computer server 500 determines the second customer ledger from the (second) credential(s), the second computer server 500 updates the second institution journal 516 with a journal entry that identifies a transfer of funds/points from the second customer ledger to the second institution ledger 514 in an amount that is equal to the authorization value. The second computer server 500 may also update the second customer ledger with an entry that indicates funds/points in an amount that is equal to the authorization value have been withdrawn from the second customer ledger, and may update the second institution ledger 514 with an entry that indicates funds/points in an amount that is equal to the authorization value have been deposited into the second institution ledger 514.

After the second computer server 500 updates the second institution journal 516, at step S714 the second computer server 500 generates a service option authorization message from the service option confirmation message and transmits the service option authorization message to the ledger server 600 via the wide area network 140. The service option authorization message includes at least the service option identifier and the authorization value, and may also include the status parameter. Therefore, the second computer server 500 generates the service option authorization message by incorporating at least the service option identifier and the authorization value into the service option authorization message. Preferably, however, the service option authorization message excludes the (second) credential(s) of the service recipient, and also excludes particulars of the second customer ledger (and particulars of the first customer ledger).

The service option authorization message may also include one or more (second institution) credentials that are associated with the second institution. Preferably, the institution identifier of the second computer server 300 is uniquely associated with the second institution, and the service option initiation message includes the institution identifier of the second computer server 300 (second institution identifier). Alternately, the second computer server 300 may transmit the (second institution) credential (e.g. second institution identifier) to the ledger server 600 separately from the service option authorization message.

After the ledger server 600 receives the service option authorization message, the ledger server 600 validates the service option initiation message (received from the first computer server 300 at step S706) from the service option authorization message (received from the second computer server 500), and then updates the service option database 614 to confirm that the service option initiation message was validated.

As discussed above, after the ledger server 600 receives the service option initiation message from the first computer server 300, the ledger server 600 may save the service option identifier and the service option value in the service option database 614. Therefore, for each service option authorization message, the ledger server 600 validates one of the service option initiation messages by (i) locating in the service option database 614 the database record that stores the service option identifier (e.g. by querying the service option database 614 with the service option identifier included in the service option authorization message), and (ii) confirming that the service option value in the located database record matches the authorization value that was included in the service option authorization message.

Further, as discussed, the service option initiation message may include a status parameter that indicates whether the associated service option was selected online or was selected at the service provider's business premises, and the ledger server 600 may have saved the status parameter in the service option database 614 in association with the service option identifier and the service option value. Therefore, for each service option authorization message, the ledger server 600 may further validate one of the service option initiation messages by confirming that the status parameter in the located database record matches the status parameter that was included in the service option authorization message.

After the ledger server 600 validates the service option initiation message, the ledger server 600 updates the located database record in the service option database 614 with a confirmation database entry that identifies the current time/date and confirms that the service option value (included in the service option initiation message) matches the authorization value (included in the service option authorization message).

Further, after the ledger server 600 receives the (second institution) credential from the second computer server 500, the ledger server 600 may also determine the second institution ledger from the (second institution) credential. The ledger server 600 may determine the second institution ledger by (i) querying the institution profile database 618 with the (second institution) credential(s) received from the second computer server 500 for the database record that is associated with the second institution, and (ii) extracting the second institution ledger identifier from the located database record. The ledger server 600 may then store the second institution ledger identifier in the service option database 614, in association with the service option identifier, thereby identifying the second institution as the service recipient for the service option.

At step S716, the ledger server 600 transmits to the first computer server 300, via the wide area network 140, a service initiation validation message that includes the service option identifier and the status parameter (if any) and confirms that the associated service option initiation message has been validated. At step S716, the ledger server 600 may also transmit to the second computer server 500, via the wide area network 140, a service authorization validation message that includes the service option identifier and the status parameter (if any) and confirms that the associated service option authorization message has been validated.

If the status parameter indicates that the associated service option was selected at the service provider's business premises, the service provider might be waiting for confirmation that the service recipient has provided full payment for the selected service option, before the service provider provides the service recipient with the goods/services requested. Therefore, if the status parameter, received in the service initiation validation message at step S716, indicates that the associated service option was selected at the service provider's business premises, the first computer server 300 updates the first institution journal 316 with a journal entry that identifies a transfer of funds/points from the first institution ledger 314 to the first customer ledger in an amount that is equal to the service option value. The first computer server 300 may also update the first institution ledger 314 with an entry that indicates funds/points in an amount that is equal to the service option value have been withdrawn from the first institution ledger 314, and may update the first customer ledger with an entry that indicates funds/points in an amount that is equal to the service option value have been deposited into the first customer ledger. At step S718, the first computer server 300 transmits to the first communications device 200 a notification message that confirms that funds/points in an amount that is equal to the service option value have been deposited into the first customer ledger. The first communications device 200 may then display the notification message on the display device 204.

Similarly, if the status parameter indicates that the associated service option was selected at the service provider's business premises, the service recipient might be waiting for confirmation that the service provider has received payment for the goods/services requested. Therefore, if the status parameter, received in the service authorization validation message at step S716, indicates that the associated service option was selected at the service provider's business premises, at step S718 the second computer server 500 transmits to the second communications device 400 a notification message that confirms that funds/points in an amount that is equal to the authorization value have been withdrawn from the second customer ledger. The second communications device 400 may then display the notification message on the display device 402.

However, if the status parameter indicates that the associated service option was selected online, the service provider might not expect to receive confirmation that the service recipient has provided full payment for the selected service option, before the service provider provides the service recipient with the goods/services requested. Instead, the service provider might only expect to receive confirmation that the selected service option has been authorized, before the service provider provides the service recipient with the goods/services requested. Therefore, if the status parameter, received in the service initiation validation message at step S716, indicates that the associated service option was selected online, the first computer server 300 may forego updating the first customer ledger, the first institution ledger 314 and the first institution journal 316, as described above. Instead, in this implementation, the first computer server 300 may transmit to the first communications device 200 a notification message that confirms that the selected service option was authorized. The first communications device 200 may then display the notification message on the display device 204.

Similarly, if the status parameter indicates that the associated service option was selected online, the service recipient may be waiting for confirmation that the selected service option has been authorized. Therefore, if the status parameter, received in the service authorization validation message at step S716, indicates that the associated service option was selected online, at step S718 the second computer server 500 transmits to the second communications device 400 a notification message that confirms that the selected service option was authorized. The second communications device 400 may then display the notification message on the display device 402.

As discussed above, one or more of the online service options identified on the service provider's web page(s) may identify one or more performance parameters (e.g. milestones and associated partial payment amounts that the service provider is entitled to receive upon fulfillment of the associated milestone), and the ledger server 600 may save the service option identifier and the service option value in the service option database 614 in association with the associated performance parameter(s). Therefore, after the service provider completes one performance milestone (e.g. the service provider ships the good(s) or performs an initial service required by the selected performance option), the operator of the first communications device 200 may confirm (to the service option selection processor 220, via the input device 202) completion of the performance milestone. In response, at step S720, the first communications device 200 may transmit to the first computer server 300, via the wide area network 140 or the mobile communications network 150, a (first) action notification message that includes the service option identifier of the selected service option.

The first computer server 300 transforms the (first) action notification message into a ledger update request for subsequent processing by the ledger server 600. For example, after the first computer server 300 receives the action notification message, at step S722 the first computer server 300 may generate a (first) ledger update request that includes the service option identifier, and may transmit the (first) ledger update request to the ledger server 600 via the wide area network 140. Preferably, the (first) ledger update request excludes the (first) credential(s) previously provided by the first communications device 200 (included with (or received by the first computer server 300 separately from) the service option selection message) and also excludes particulars of the first customer ledger.

After the ledger server 600 receives the (first) ledger update request from the first computer server 300, the ledger server 600 locates in the service option database 614 the database record that includes the service option identifier identified in the (first) ledger update request (by querying the service option database 614 with the service option identifier), and determines whether the located database record includes a confirmation database entry (confirming that the service option value of the located database record was successfully matched to an authorization value that was included in a service option authorization message).

If the ledger server 600 confirms that the located database record includes a confirmation database entry, at step S724 the ledger server 600 determines a first transfer amount, generates a (first) ledger update authorization message that includes the service option identifier and authorizes a release of funds/points in an amount equal to the first transfer amount, and transmits the (first) ledger update authorization message to the first computer server 300 via the wide area network 140. Further, to prevent the improper release of multiple ledger update authorization messages (in response to multiple action notification message issued by the first communications device 200), the ledger server 600 may also update the located database record with a database entry confirming that a release of funds/points in the first transfer amount has been authorized, and may avoid transmitting a ledger update authorization message to the first computer server 300 if the located database record already includes such a database entry.

As discussed, the performance parameter(s) saved in the service option database 614 in association with the service option identifier may identify one or more partial payment amounts that the service provider is entitled to receive upon fulfillment of the associated milestone. Therefore, the ledger server 600 may determine the first transfer amount by extracting the performance parameter(s) from the located database entry, and generate the first transfer amount by evaluating the performance parameter(s).

For example, in one implementation, the performance parameter(s) of the located database entry may associate a fixed payment value with the first milestone. Therefore, in this implementation, the ledger server 600 may use the fixed payment value as the first transfer amount. Alternately, in another implementation, the performance parameter(s) of the located database entry may associate a percentage value with the first milestone. Therefore, this alternate implementation, the ledger server 600 may generate the first transfer amount by multiplying the percentage value by the service option value. In yet another implementation, the performance parameter(s) may indicate that the first transfer amount is a fixed payment for service option values less (or greater) than a predetermined threshold, and that the first transfer amount is otherwise computed from a percentage value and the service option value. In both implementations, however, the first transfer amount will be less than the service option value.

After the first computer server 300 receives the (first) ledger update authorization message, the first computer server 300 updates the first institution journal 316 with a journal entry that identifies a transfer of funds/points from the first institution ledger 314 to the first customer ledger in an amount that is equal to the first transfer amount. The first computer server 300 may also update the first institution ledger 314 with an entry that indicates funds/points in an amount that is equal to the first transfer amount have been withdrawn from the first institution ledger 314, and may update the first customer ledger with an entry that indicates funds/points in an amount that is equal to the first transfer amount have been deposited into the first customer ledger.

At step S726, the first computer server 300 may transmit to the first communications device 200 a notification message that confirms that funds/points in an amount that is equal to the first transfer amount have been deposited into the first customer ledger. The first communications device 200 may then display the notification message on the display device 204.

Similarly, after the service provider completes another performance milestone (e.g. the service recipient receives the goods or services required by the selected performance option), the operator of the second communications device 400 may confirm (to the service option selection processor 420, via the input device 402) completion of the performance milestone. In response, at step S728, the second communications device 400 may transmit to the second computer server 500, via the wide area network 140 or the mobile communications network 150, a (second) action notification message that includes the service option identifier of the selected service option.

The second computer server 500 transforms the (second) action notification message into a ledger update request for subsequent processing by the ledger server 600. For example, after the second computer server 500 receives the (second) action notification message, at step S730 the second computer server 500 may generate a (second) ledger update request that includes the service option identifier, and may transmit the (second) ledger update request to the ledger server 600 via the wide area network 140. Preferably, the (second) ledger update request excludes the (second) credential(s) previously provided by the second communications device 400 (included with (or received by the second computer server 500 separately from) the service option confirmation message) and also excludes particulars of the second customer ledger.

After the ledger server 600 receives the (second) ledger update request from the second computer server 500, the ledger server 600 locates in the service option database 614 the database record that includes the service option identifier identified in the (second) ledger update request (by querying the service option database 614 with the service option identifier), and determines whether the located database record includes a confirmation database entry (confirming that the service option value of the located database record was successfully matched to an authorization value that was included in a service option authorization message).

If the ledger server 600 confirms that the located database record includes a confirmation database entry, the ledger server 600 determines a second transfer amount, and generates a (second) ledger update authorization message that includes the service option identifier and authorizes a release of funds/points in an amount equal to the second transfer amount. At step S732, the ledger server 600 identifies the first institution identifier from the located database record, and transmits the (second) ledger update authorization message to the first computer server 300 via the wide area network 140. The ledger server 600 may also update the located database record with a database entry confirming that a release of funds/points in the second transfer amount has been authorized.

The second transfer amount is typically equal to the difference between the service option value and the first transfer amount (i.e. the balance of the service option amount that has not yet been transferred) and, therefore, the ledger server 600 may determine the second transfer amount by calculating the difference between the service option value and the first transfer amount.

However, it should be understood that the references herein to "(first)" and "(second)" ledger update requests is not intended to indicate that the ledger server 600 only receives the "second" ledger update request after the ledger server 600 receives the "first" ledger update request. Rather, the reference to references herein to "(first)" and "(second)" ledger update requests is only intended to differentiate between possible partial payments. It should also be understood that, in some implementations, the ledger server 600 might not receive a "first" ledger update request but instead might only receive the "second" ledger update request and, therefore, the ledger server 600 might only generate the "second" ledger update authorization message. Accordingly, in this variation, the server 600 may determine the second transfer amount by extracting the performance parameter(s) from the located database entry, and generate the second transfer amount by evaluating the performance parameter(s). As discussed above (with reference to the first transfer amount), in this variation the second transfer amount will be less than the service option value.

After the first computer server 300 receives the (second) ledger update authorization message, the first computer server 300 updates the first institution journal 316 with a journal entry that identifies a transfer of funds/points from the first institution ledger 314 to the first customer ledger in an amount that is equal to the second transfer amount. The first computer server 300 may also update the first institution ledger 314 with an entry that indicates funds/points in an amount that is equal to the second transfer amount have been withdrawn from the first institution ledger 314, and may update the first customer ledger with an entry that indicates funds/points in an amount that is equal to the second transfer amount have been deposited into the first customer ledger.

At step S734, the first computer server 300 may transmit to the first communications device 200 a notification message that confirms that funds/points in an amount that is equal to the second transfer amount have been deposited into the first customer ledger. The first communications device 200 may then display the notification message on the display device 204.

Over a period of time, the ledger server 600 will process multiple service option initiation messages and multiple service option authorization messages. Therefore, over this time period, the first computer server 300 will transfer funds/points from the first institution ledger 314 (into a plurality of first customer ledgers), and the second computer server 500 will transfer funds/points into the second institution ledger 514 (from a plurality of second customer ledgers). However, as funds/points might not have been transferred from the second institution ledger 514 to the first institution ledger 314 during this time period, in effect the first institution will have advanced funds/points to the customers of the first institution on behalf of the customers of the second institution.

Although, in the foregoing examples, the first computer server 300 was associated with the service provider, and the second computer server 500 was associated with the service recipient, in some iterations the first computer server 300 may be associated with the service recipient, and the second computer server 500 may be associated with the service provider. Therefore, over a time period, the second computer server 500 may transfer funds/points from the second institution ledger 514 (into a plurality of second customer ledgers), and the first computer server 300 may transfer funds/points into the first institution ledger 314 (from a plurality of first customer ledgers). However, as funds/points might not have been transferred from the first institution ledger 314 to the second institution ledger 514 during this time period, in effect the second institution might have also advanced funds/points to the customers of the second institution on behalf of the customers of the first institution.

To account for the funds/points advanced by the first institution (and the second institution), the ledger server 600 periodically effects a settlement process between the first institution ledger 314 and the second institution ledger 514.

As will be apparent, over a period of time, a plurality of the database records stored in the service option database 614 may include a confirmation database entry that confirms that the associated service option value was successfully matched against an authorization value that was received from the second computer server 500 (i.e. a confirmation database entry that confirms the validity of the database record). A plurality of the database records may also include a respective database record confirming that a partial release of funds/points to the service provider, in an amount equal to the first transfer amount (and/or an amount equal to the second transfer amount), was authorized. Therefore, the ledger server 600 effects the settlement process by determining the sum of the service option values of the service option initiation messages that have been validated, and updating the settlement journal 616 with a journal entry that identifies a transfer between the first institution ledger and the second institution ledger in an amount that is equal to the calculated sum of the service option values.

As discussed above, after the ledger server 600 validates a service option initiation message, the ledger server 600 updates the associated database record in the service option database 614 with a confirmation database entry that confirms that the service option value received from the first computer server 300 matched the authorization value received from the second computer server 500. One or more of the database records of the service option database 614 may also include a status parameter indicating that the associated service option was selected at the service provider's business premises. From such a database record, the first computer server 300 may have updated the first customer ledger with an entry that indicates funds/points in an amount that is equal to the service option value have been deposited into the first customer ledger (i.e. the first institution advanced funds/points to the first customer in an amount equal to the service option value). Therefore, the ledger server 600 may determine the sum of the service option values of the validated service option initiation messages by (a) locating, in the service option database 614, the database records that include (i) a confirmation database record, (ii) a status parameter that indicates that the associated service option was selected at the service provider's business premises, and (iii) a database entry that indicates that the first institution was the service provider; and (b) calculating the total value of the service option values of the located database records.

One or more of the database records of the service option database 614 may include a status parameter indicating that the associated service option was selected online. Further, one or more of the database records of the service option database 614 may include a database entry confirming that a release of funds/points in the first transfer amount was authorized. From such a database record, the first institution may have advanced funds/points to the first customer in an amount equal to the first transfer amount. Therefore, the ledger server 600 may also determine the sum of the service option values of the validated service option initiation messages by (i) locating, in the service option database 614, the database records that include (i) a confirmation database record, (ii) a status parameter that indicates that the associated service option was selected online, (iii) a database entry that confirms authorization of a release of funds/points in the first transfer amount, and (iv) a database entry that indicates that the first institution was the service provider; and (b) calculating the total value of the first transfer amounts of the located database records.

One or more of the database records of the service option database 614 may include a database entry confirming that a release of funds/points in the second transfer amount was authorized. From such a database record, the first institution may have advanced funds/points to the first customer in an amount equal to the second transfer amount. Therefore, the ledger server 600 may also determine the sum of the service option values of the validated service option initiation messages by (i) locating, in the service option database 614, the database records that include (i) a confirmation database record, (ii) a status parameter that indicates that the associated service option was selected online, (iii) a database entry that confirms authorization of a release of funds/points in the second transfer amount, and (iv) a database entry that indicates that the first institution was the service provider; and (b) calculating the total value of the second transfer amounts of the located database records.

The ledger server 600 may calculate the sum of the foregoing totals values (total value of service option values of the validated service options selected at the service provider's business premises, total value of first transfer amounts of the validated service options selected online, total value of second transfer amounts of the validated service options selected online), and may also calculate the sum of the foregoing totals for instances where the second institution was the service provider (and the first institution was the service recipient). The ledger server 600 may then calculate a net transfer amount from a difference between (i) the sum of the foregoing totals values where the first institution was the service provider and (ii) the sum of the foregoing totals values where the second institution was the service provider.

The ledger server 600 may then determine whether the balance of funds/points in the applicable institution ledger is sufficient to satisfy a payment in an amount equal to the net transfer amount. If the ledger server 600 determines that the balance of funds/points in the applicable institution ledger is sufficient, the ledger server 600 may update the settlement journal 616 with a journal entry that identifies a transfer of funds/points between the first institution ledger and the second institution ledger in an amount that is equal to the calculated net transfer amount.

For example, if the outcome of the net transfer amount calculation reveals that the second institution owes the first institution a payment in the amount of the net transfer amount, the ledger server 600 determines whether the balance of funds/points in the second institution ledger is sufficient to satisfy that payment. If the balance in the second institution ledger is sufficient to satisfy the payment, the ledger server 600 may update the settlement journal 616 with a journal entry that identifies a transfer of funds/points from second institution ledger to the first institution ledger in an amount equal to the net transfer amount.

Conversely, if the outcome of the net transfer amount calculation reveals that the first institution owes the second institution a payment in the amount of the net transfer amount, the ledger server 600 determines whether the balance of funds/points in the first institution ledger is sufficient to satisfy that payment. If the balance in the first institution ledger is sufficient to satisfy the payment, the ledger server 600 may update the settlement journal 616 with a journal entry that identifies a transfer of funds/points from first institution ledger to the second institution ledger in an amount equal to the net transfer amount.

After the ledger server 600 updates the settlement journal 616, at step S736 the ledger server 600 transmits to the first computer server 300, via the wide area network 140, a settlement message that confirms the transfer of funds/points between the first institution ledger and the second institution ledger. At step S736, the ledger server 600 may also transmit to the second computer server 500, via the wide area network 140, a settlement message that confirms the transfer of funds/points between the first institution ledger and the second institution ledger.

However, if the outcome of the net transfer amount calculation reveals that the balance of funds/points in the applicable institution ledger is insufficient to satisfy a payment in an amount equal to the net transfer amount, the ledger server 600 may transmit to the applicable computer server (first computer server 300 or second computer server 500) a message advising the (first or second) institution of the deficiency and requesting a transfer of funds from the institution in amount sufficient to effect a payment in an amount equal to the net transfer amount.

After the ledger server 600 receives the required payment from the institution, the ledger server 600 may update the settlement journal 616 with a journal entry that identifies a transfer of funds/points between the first institution ledger and the second institution ledger in an amount equal to the net transfer amount. At step S736, the ledger server 600 may transmit settlement messages to the first and second computer servers 300, 500, as described above.

The invention claimed is:

1. A ledger server comprising:
a memory storing a service option database, a settlement journal and a plurality of computer processing instructions; and
a data processor in communication with the memory, wherein the computer processing instructions cause the data processor to:
receive at least one service option initiation message from a first computer server, each said service option initiation message including a service option identifier and a service option value;
for each said service option initiation message, save in the service option database a database record comprising the service option identifier in association with the service option value;
receive at least one service option authorization message from a second computer server distinct from the first computer server, each said service option authorization message including one of the service option identifiers and an authorization value;
for each said service option authorization message, validate one of the service option initiation messages and update the service option database with a confirmation database entry, the confirmation database entry comprising the one service option value and confirming validation of the one service option initiation message, the validate the one service option initiation message comprising (i) locating in the service option database the database record comprising the one service option identifier, and (ii) confirming that the service option value in the located database record matches the authorization value;
receive at least one ledger update request from one of the computer servers, one of the ledger update requests including the one service option identifier, and validate the one ledger update request by (i) locating in the service option database the database record comprising the one service option identifier, and (ii) confirming that the located database record includes the confirmation database entry;
determine a first transfer amount, and effect a first transfer from a first institution ledger to a first customer ledger in an amount equal to the first transfer amount, the effect a first transfer comprising transmitting to the first computer server a ledger update authorization comprising the transfer amount;
update the settlement journal with a settlement journal entry identifying a settlement transfer between the first institution ledger and a second institution ledger in an amount equal to a sum of the service option values of the validated service option initiation messages; and
provide the first computer server with a settlement message confirming the settlement transfer.

2. The ledger server according to claim 1, wherein the first transfer amount is less than the service option value of the located database record.

3. The ledger server according to claim 2, wherein the computer processing instructions further cause the data processor to:

receive a second ledger update request from the second computer server, the second ledger update request including the one service option identifier;
locate in the service option database the database record comprising the one service option identifier;
confirm that the located database record includes the confirmation database entry;
determine a second transfer amount from a difference between the first transfer amount and the service option value of the located database record; and
transmit a second ledger update authorization to the first computer server,
wherein the second ledger update authorization includes the one service option identifier and authorizes a second partial transfer in an amount equal to the second transfer amount.

4. A data processing network comprising:
a first computer server;
a second computer server distinct from the first computer server; and
a ledger server,
wherein the ledger server is configured to:
receive at least one service option initiation message from the first computer server, each said service option initiation message including a service option identifier and a service option value;
for each said service option initiation message, save in a service option database a database record comprising the service option identifier in association with the service option value;
receive at least one service option authorization message from the second computer server, each said service option authorization message including one of the service option identifiers and an authorization value;
for each said service option authorization message, validate one of the service option initiation messages and update the service option database with a confirmation database entry, the confirmation database entry comprising the one service option value and confirming validation of the one service option initiation message, the validate the one service option initiation message comprising (i) locating in the service option database the database record comprising the one service option identifier, and (ii) confirming that the service option value in the located database record matches the authorization value;
receive at least one ledger update request from one of the computer servers, one of the ledger update requests including the one service option identifier, and validate the one ledger update request by (i) locating in the service option database the database record comprising the one service option identifier, and (ii) confirming that the located database record includes the confirmation database entry;
determine a first transfer amount, and effect a first transfer from a first institution ledger to a first customer ledger in an amount equal to the first transfer amount, the effect a first transfer comprising transmitting to the first computer server a ledger update authorization comprising the transfer amount;
update a settlement journal with a settlement journal entry identifying a settlement transfer between the first institution ledger and a second institution ledger in an amount equal to a sum of the service option values of the validated service option initiation messages; and provide the first computer server with a settlement message confirming the settlement transfer.

5. The data processing network according to claim 4, further comprising a second communications device, wherein the second computer server is configured to:
receive a second credential and an service option confirmation message from the second communications device, the service option confirmation message including the one service option identifier and the authorization value;
determine a second customer ledger from the second credential;
update a transaction journal with a transaction journal entry identifying a transfer from the second customer ledger in an amount equal to the authorization value;
incorporate the one service option identifier and the service option value into the service option authorization message; and
transmit the service option authorization message to the ledger server,
wherein the service option authorization message excludes a ledger identifier of the second customer ledger.

6. The data processing network according to claim 5, wherein the
first transfer amount is less than the service option value of the located database record.

7. The data processing network according to claim 5, further comprising a first communications device distinct from the second communications device, wherein the first computer server is configured to:
receive a first credential and the one service option identifier from the first communications device;
determine the first customer ledger from the first credential;
associate the first customer ledger with the one service option identifier;
transmit the at least one service option initiation message to the ledger server;
receive a first action notification from the first communications device, the first action notification including the one service option identifier;
transmit the at least one ledger update request to the ledger server;
receive the ledger update authorization from the ledger server;
determine the first customer ledger from the first ledger update authorization;
update a transaction journal with a transaction journal entry identifying the first transfer into the first customer ledger; and
transmit to the first communications device a first payment notification confirming the first transfer,
wherein the at least one initiation message and the first ledger update request exclude the first credential and exclude a ledger identifier of the first customer ledger.

8. The data processing network according to claim 5, further comprising a first communications device distinct from the second communications device, wherein the first computer server is configured to:
receive an option selection message from the first communications device, the option selection message including the service option value;
generate the at least one service option initiation message from the option selection message; and
transmit the at least one service option initiation message to the ledger server,
wherein the option selection message and the at least one service option initiation message exclude a ledger identifier of the second customer ledger.

9. The data processing network according to claim 5, wherein the ledger server is further configured to:
receive a second ledger update request from the second computer server, the second ledger update request including the one service option identifier;
locate in the service option database the database record comprising the one service option identifier;
confirm that the located database record includes the confirmation database entry;
determine a second transfer amount from a difference between the first transfer amount and the service option value of the located database record; and
transmit a second ledger update authorization to the first computer server,
wherein the second ledger update authorization includes the one service option identifier and authorizes a second transfer in an amount equal to the second transfer amount.

10. The data processing network according to claim 9, wherein the second computer server is further configured to:
receive a second action notification from the second communications device, the second action notification including the one service option identifier; and
transmit the second ledger update request to the ledger server in response to receiving the second action notification,
wherein the second ledger update request excludes a ledger identifier of the second customer ledger.

11. The data processing network according to claim 9, further comprising a first communications device distinct from the second communications device, wherein the first computer server is configured to:
receive a first credential and the one service option identifier from the first communications device;
determine the first customer ledger from the first credential;
associate the first customer ledger with the one service option identifier;
receive the second ledger update authorization from the ledger server;
determine the first customer ledger from the one service option identifier;
update a transaction journal with a transaction journal entry identifying the second transfer into the first customer ledger; and
transmit to the first communications device a second payment notification confirming the second transfer,
wherein the second ledger update request excludes the first credential and excludes a ledger identifier of the first customer ledger.

12. A method of institution ledger settlement comprising a ledger server:
receiving at least one service option initiation message from a first computer server, each said service option initiation message including a service option identifier and a service option value, and for each said service option initiation message saving in a service option database a database record comprising the service option identifier in association with the service option value;
receiving at least one service option authorization message from a second computer server distinct from the first computer server, each said service option authorization message including one of the service option identifiers and an authorization value, and for each said service option authorization message validating one of the service option initiation messages and updating the service option database with a confirmation database entry, the confirmation database entry comprising the one service option value and confirming validation of the one service option initiation message, the validating the one service option initiation message comprising (i) locating in the service option database the database record comprising the one service option identifier, and (ii) confirming that the service option value in the located database record matches the authorization value;

receiving at least one ledger update request from one of the computer servers, one of the ledger update requests including the one service option identifier, and validating the one ledger update request by (i) locating in the service option database the database record comprising the one service option identifier, and (ii) confirming that the located database record includes the confirmation database entry;

determining a first transfer amount, and effecting a first transfer from a first institution ledger to a first customer ledger in an amount equal to the first transfer amount, the effecting a first transfer comprising transmitting to the first computer server a ledger update authorization comprising the transfer amount; and updating a settlement journal with a settlement journal entry identifying a settlement transfer between the first institution ledger and a second institution ledger in an amount equal to a sum of the service option values of the validated service option initiation messages, and providing the first computer server with a settlement message confirming the settlement transfer.

13. The method according to claim 12, wherein the receiving at least one service option authorization message comprises the second computer server:

receiving a second credential and an service option confirmation message from a second communications device, the service option confirmation message including the one service option identifier and the authorization value;

determining a second customer ledger from the second credential;

updating a transaction journal with a transaction journal entry identifying a second transfer from the second customer ledger in an amount equal to the authorization value;

incorporating the one service option identifier and the authorization value into the service option authorization message; and transmitting the service option authorization message to the ledger server, wherein the service option authorization message excludes a ledger identifier of the second customer ledger.

14. The method according to claim 13, wherein the first transfer amount is less than the service option value of the located database record.

15. The method according to claim 13, wherein the receiving at least one service option initiation message comprises the first computer server:

receiving a first credential and the one service option identifier from a first communications device distinct from the second communications device, determining the first customer ledger from the first credential, associating the first customer ledger with the one service option identifier, and transmitting the at least one service option initiation message to the ledger server, the receiving at least one ledger update request comprises the first computer server:

receiving a first action notification from the first communications device, the first action notification including the one service option identifier, and transmitting the at least one ledger update request to the ledger server; and the transmitting a ledger update authorization comprises the first computer server:

receiving the ledger update authorization from the ledger server, determining the first customer ledger from the ledger update authorization, updating a transaction journal with a transaction journal entry identifying the first transfer into the first customer ledger, and transmitting to the first communications device a first payment notification confirming the first transfer, wherein the at least one service option initiation message and the first ledger update request exclude the first credential and exclude a ledger identifier of the first customer ledger.

16. The method according to claim 13, wherein the receiving at least one service option initiation message comprises the first computer server:

receiving an option selection from a first communications device distinct from the second communications device, the option selection including the service option value;

generating the at least one service option initiation message from the option selection; and transmitting the at least one service option initiation message to the ledger server, wherein the option selection and the at least one service option initiation message excludes a ledger identifier of the second customer ledger.

17. The method according to claim 13, wherein the validating one of the service option initiation messages further comprises the ledger server:

receiving a second ledger update request from the second computer server, the second ledger update request including the one service option identifier;

locating in the service option database the database record comprising the one service option identifier;

confirming that the located database record includes the confirmation database entry;

determining a second transfer amount from a difference between the first transfer amount and the service option value of the located database record; and transmitting a second ledger update authorization to the first computer server, wherein the second ledger update authorization includes the one service option identifier and authorizes a second transfer in an amount equal to the second transfer amount.

18. The method according to claim 17, wherein the receiving a second ledger update request comprises the second computer server:

receiving a second action notification from the second communications device, the second action notification including the one service option identifier; and transmitting the second ledger update request to the ledger server in response to receiving the second action notification, wherein the second ledger update request excludes a ledger identifier of the second customer ledger.

19. The method according to claim 17, wherein the receiving at least one service option initiation message comprises the first computer server:

receiving a first credential and the one service option identifier from a first communications device distinct from the second communications device, determining the first customer ledger from the first credential, associating the first customer ledger with the one service option identifier, and transmitting the at least one service option initiation message to the ledger server; and the transmitting a second ledger update authorization comprises the first computer server:

receiving the second ledger update authorization from the ledger server, determining the first customer ledger from the one service option identifier, updating a transaction journal with a transaction journal entry identifying the second transfer into the first customer ledger, and transmitting to the first communications device a second payment notification confirming the second transfer, wherein the at least one service option initiation message and the second ledger update request exclude the first credential and exclude a ledger identifier of the first customer ledger.

20. The method according to claim 12, further comprising, for each said service option authorization message, providing the first computer server with a transaction confirmation message, the transaction confirmation message including the one service option identifier and the authorization value.

\* \* \* \* \*